United States Patent
Lanjekar et al.

(10) Patent No.: US 12,355,194 B2
(45) Date of Patent: Jul. 8, 2025

(54) ELECTRICAL CONNECTOR FOR A MEDIUM-POWER OR HIGH-POWER ELECTRICAL DISTRIBUTION NETWORK

(71) Applicant: Eaton Intelligent Power Limited, Dublin (IE)

(72) Inventors: Puneet Lanjekar, Nasik (IN); Vijay Kumar, Kolkata (IN); Minal Waghmore, Ichalkaranji (IN); Amrapali Mahajan, Pune (IN); Ravindra Rikame, Tal/Dist Nashik (IN); Ajay Chidambaram Pillai Swornalatha, Nagercoil (IN); Nikhil Shinde, Mumbai (IN); Shruti Lahade, Pune (IN); Ronit Gupta, Pune (IN); Mangesh Pingle, Vadodara (IN); Prasad Dharmadhikari, Nagpur (IN); Syed Kazim Abbas, Uttar Pradesh (IN)

(73) Assignee: Eaton Intelligent Power Limited, Dublin (IE)

( * ) Notice: Subject to any disclaimer, the term of this patent is extended or adjusted under 35 U.S.C. 154(b) by 499 days.

(21) Appl. No.: 17/706,776

(22) Filed: Mar. 29, 2022

(65) Prior Publication Data
US 2022/0329019 A1    Oct. 13, 2022

Related U.S. Application Data

(60) Provisional application No. 63/171,738, filed on Apr. 7, 2021.

(51) Int. Cl.
*H01R 13/713*    (2006.01)
*H01R 13/502*    (2006.01)
(Continued)

(52) U.S. Cl.
CPC ........ *H01R 13/713* (2013.01); *H01R 13/502* (2013.01); *H01H 33/66207* (2013.01); *H01H 33/666* (2013.01); *H01R 13/701* (2013.01)

(58) Field of Classification Search
CPC .... H01R 13/713; H01R 13/502; H01R 13/53; H01F 27/04; H02B 13/0358; H02B 13/035; H01H 33/666
(Continued)

(56) References Cited

U.S. PATENT DOCUMENTS 6,459,557 B1    10/2002  Haensgen et al.
6,753,493 B2     6/2004  Rhein et al.
(Continued)

FOREIGN PATENT DOCUMENTS

CN    104158142 A      11/2014
CN    207938828 U  *  10/2018  ........... H01R 4/4818
(Continued)

OTHER PUBLICATIONS

Nathalie Duperron, European International Searching Authority, International Search Report and Written Opinion, counterpart PCT Application No. PCT/EP2022/025125, mailed Oct. 7, 2022, 17 pages total.

(Continued)

*Primary Examiner* — Peter G Leigh
(74) *Attorney, Agent, or Firm* — DiBerardino McGovern IP Group LLC

(57) ABSTRACT

An electrical connector includes: a housing including a mechanical interface, the mechanical interface configured to mechanically connect the electrical connector to a bushing; a current path in the housing, the current path including: an electrical conductor; and a switching apparatus electrically connected to the electrical conductor, the switching apparatus associated with operating states, the operating states
(Continued)

including at least a first state that closes the current path and a second state that opens the current path; a switch control apparatus in the housing, the switch control apparatus configured to control the operating state of the switching apparatus; and a power apparatus in the housing, the power apparatus configured to obtain electrical energy from the current path and provide electrical energy to the switch control apparatus.

27 Claims, 13 Drawing Sheets

(51) Int. Cl.
  *H01H 33/662* (2006.01)
  *H01H 33/666* (2006.01)
  *H01R 13/70* (2006.01)
(58) Field of Classification Search
  USPC .................................................. 439/620.08
  See application file for complete search history.

(56) References Cited

U.S. PATENT DOCUMENTS

| | | | |
|---|---|---|---|
| 7,215,228 B2 | 5/2007 | Rhein | |
| 7,305,335 B2 | 12/2007 | Warren | |
| 7,495,574 B2 | 2/2009 | Rocamora et al. | |
| 7,534,976 B2 | 5/2009 | Crutcher | |
| 8,334,738 B2 | 12/2012 | Smith et al. | |
| 8,879,218 B2 | 11/2014 | Tomimbang | |
| 9,373,912 B1* | 6/2016 | Juds | H01R 13/6666 |
| 9,431,198 B2* | 8/2016 | Reuber | H01H 33/6606 |
| 9,472,892 B1* | 10/2016 | Rollmann | H01R 13/635 |
| 9,478,900 B1* | 10/2016 | Juds | H01R 13/62977 |
| 9,653,858 B2* | 5/2017 | Hanke | H01R 13/04 |
| 9,742,126 B2* | 8/2017 | Juds | H01R 13/62977 |
| 9,819,117 B2* | 11/2017 | Rollmann | H01R 13/7036 |
| 9,819,118 B2* | 11/2017 | Juds | H01F 7/06 |
| 10,418,200 B2 | 9/2019 | Spence et al. | |
| 2002/0135964 A1 | 9/2002 | Murray | |
| 2005/0082260 A1 | 4/2005 | Martin | |
| 2006/0126257 A1* | 6/2006 | Domo | H01H 33/668 |
| | | | 361/139 |
| 2015/0116878 A1 | 4/2015 | Richard et al. | |
| 2017/0018872 A1* | 1/2017 | Rollmann | H01R 13/62977 |
| 2017/0018887 A1* | 1/2017 | Juds | H01R 13/53 |
| 2017/0294275 A1 | 10/2017 | Spence et al. | |
| 2018/0062306 A1* | 3/2018 | Juds | H01R 13/62977 |
| 2019/0296542 A1 | 9/2019 | Kromrey et al. | |
| 2021/0098214 A1 | 4/2021 | Carlson et al. | |
| 2021/0203184 A1 | 7/2021 | Vankirk Simmons | |

FOREIGN PATENT DOCUMENTS

| | | | |
|---|---|---|---|
| CN | 111095689 A * | 5/2020 | ......... H01R 13/6658 |
| CN | 112185752 A | 1/2021 | |
| DE | 2822773 A * | 11/1979 | ........... H01H 85/047 |
| DE | 102017206929 A1 | 10/2018 | |
| DE | 102017213709 A1 * | 2/2019 | |
| DE | 102018204847 B3 * | 9/2019 | ......... H01H 33/6606 |
| DE | 102018127230 A1 * | 4/2020 | |
| EP | 2682973 A1 | 1/2014 | |
| EP | 2682973 B1 * | 4/2017 | ............. H01H 33/66 |
| WO | 2006028968 A1 | 3/2006 | |
| WO | WO-2019029924 A1 * | 2/2019 | |

OTHER PUBLICATIONS

Nathalie Duperron, European International Searching Authority, Invitation to Pay Fees and Partial International Search Report and Written Opinion, counterpart PCT Application No. PCT/EP2022/025125, mailed Jul. 7, 2022, 13 pages total.

* cited by examiner

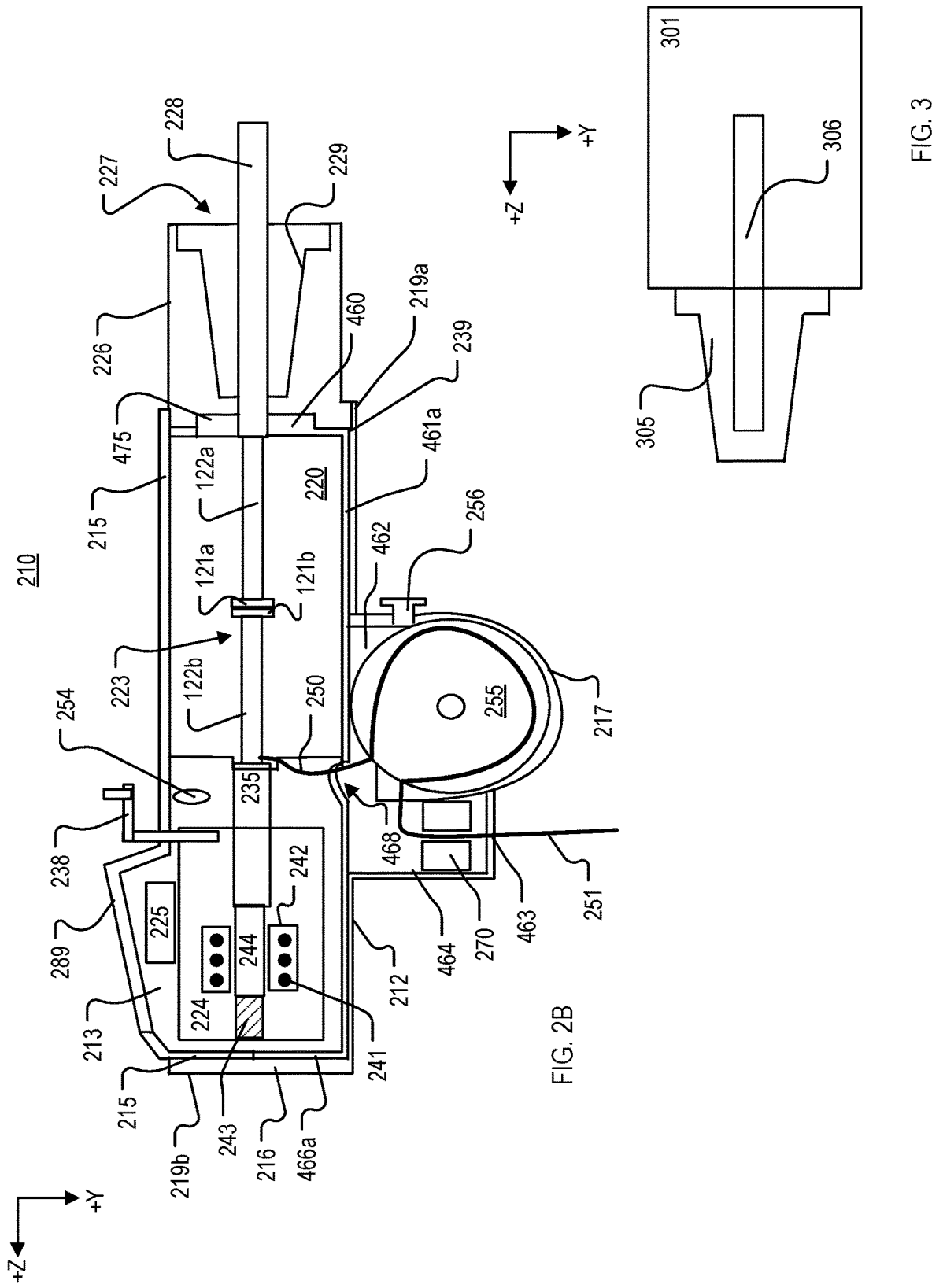

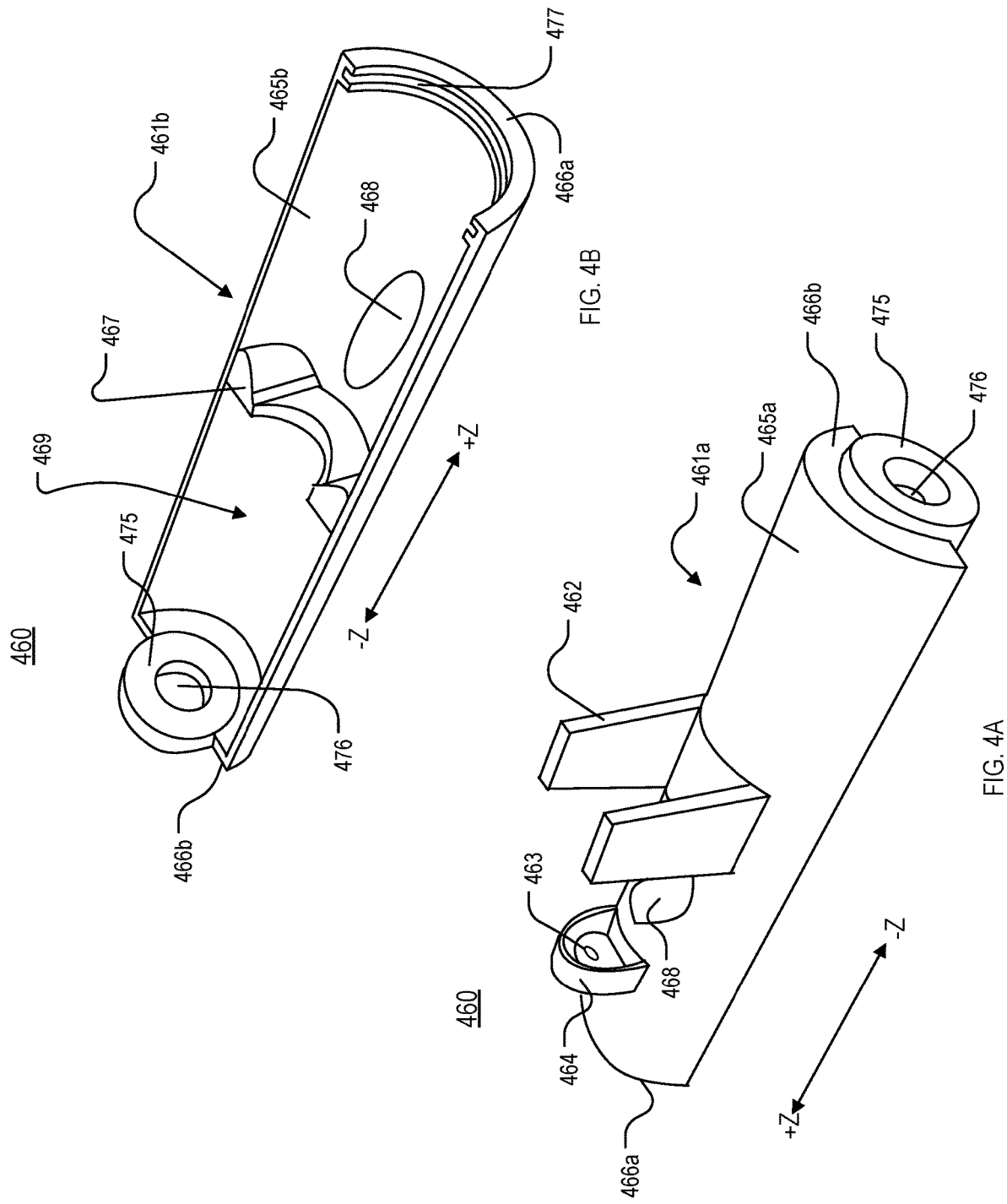

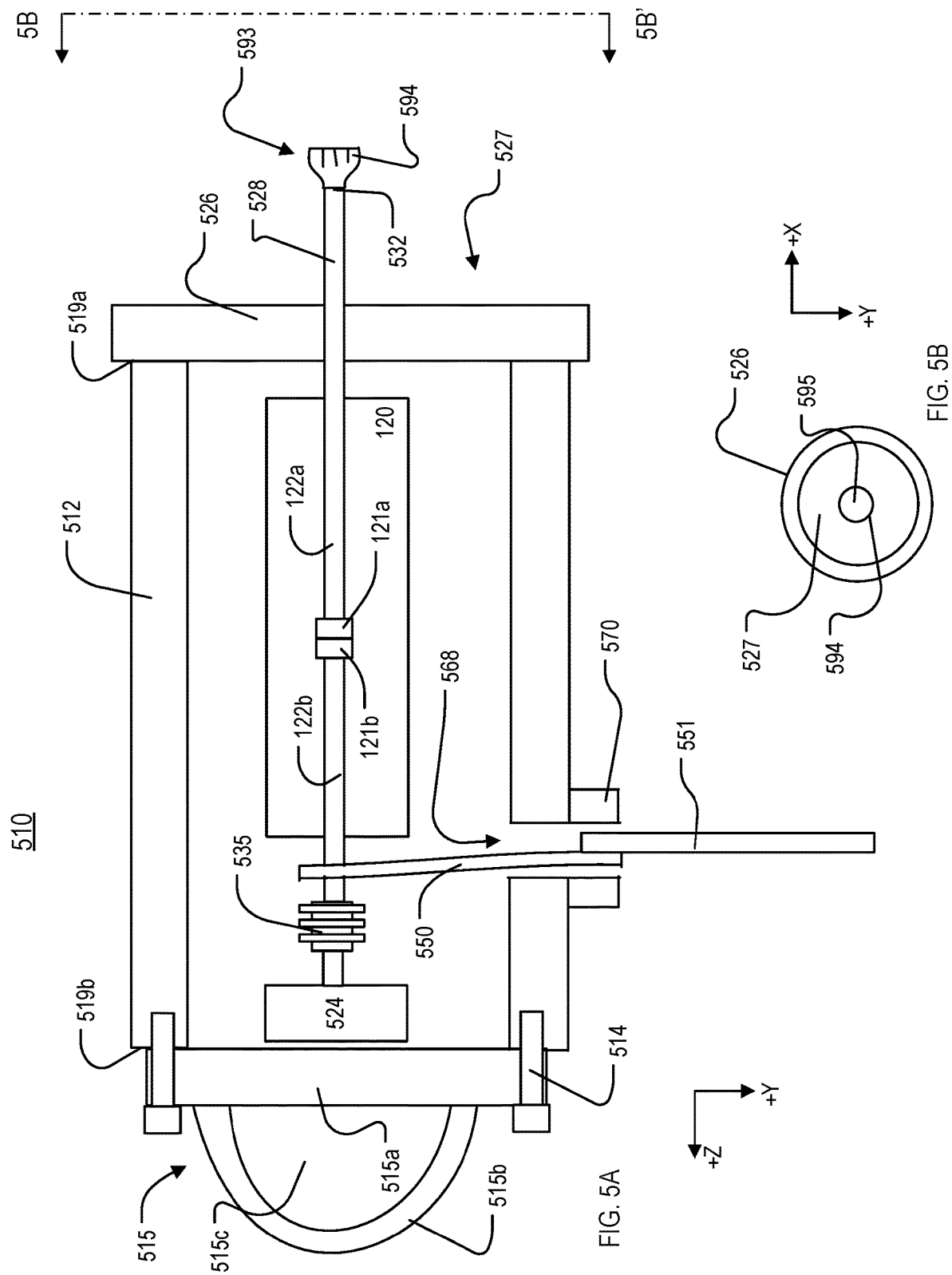

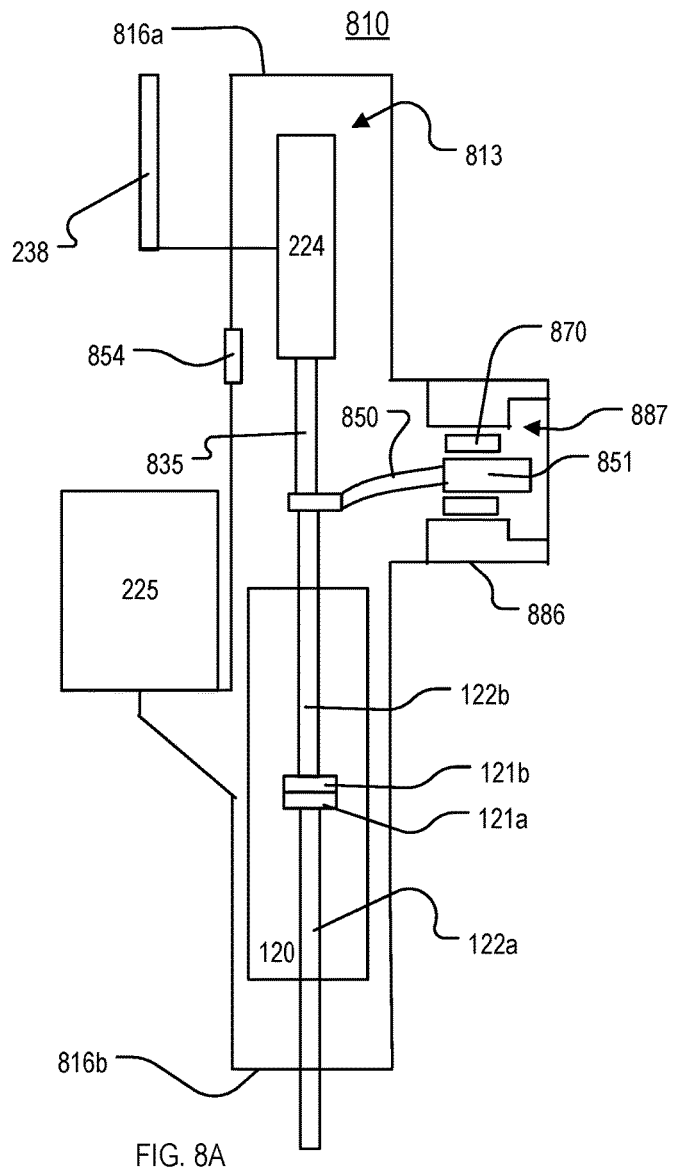
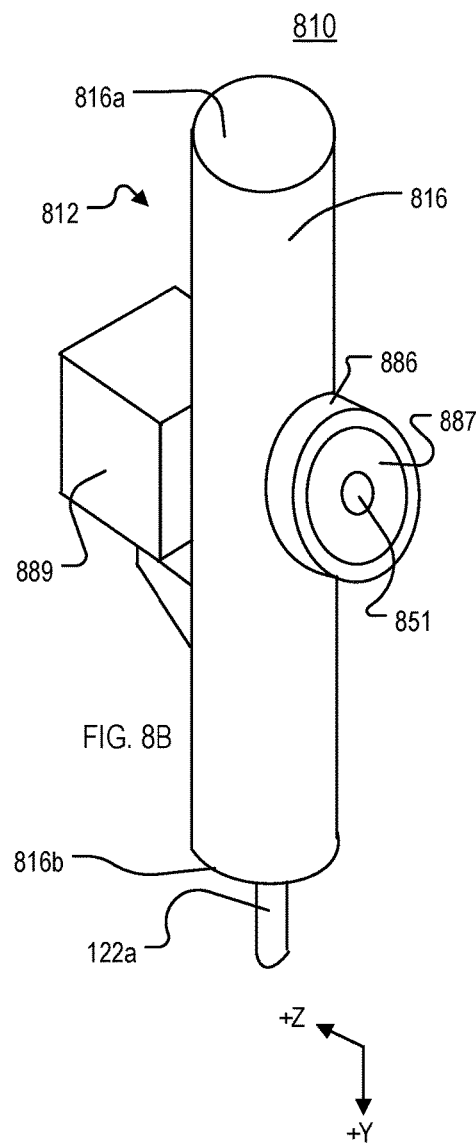
FIG. 8A
FIG. 8B

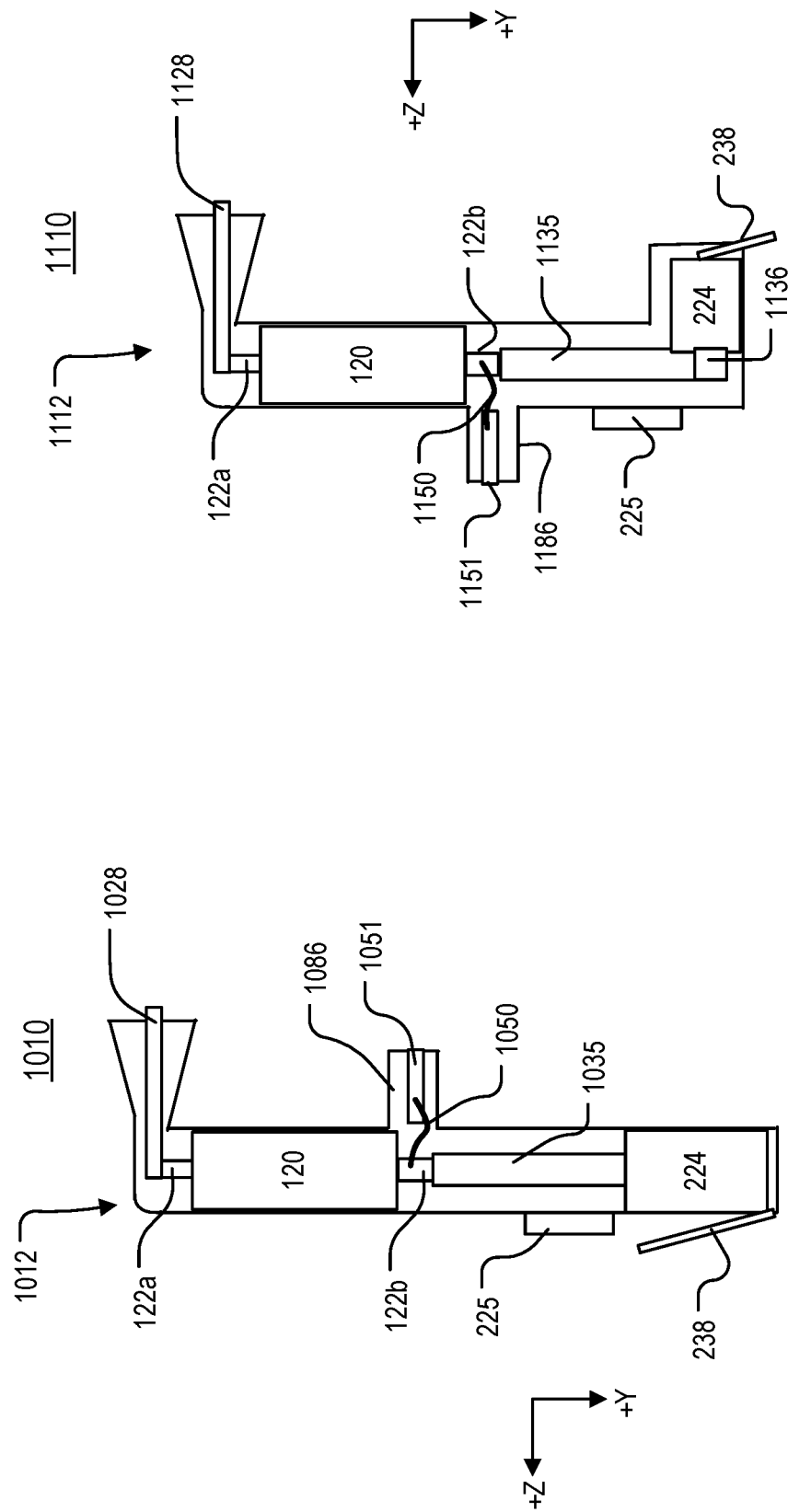

ELECTRICAL CONNECTOR FOR A MEDIUM-POWER OR HIGH-POWER ELECTRICAL DISTRIBUTION NETWORK

CROSS-REFERENCE TO RELATED APPLICATION

This application claims the benefit of U.S. Provisional Application No. 63/171,738, filed on Apr. 7, 2021 and titled ELECTRICAL CONNECTOR FOR A MEDIUM-POWER OR HIGH-POWER ELECTRICAL DISTRIBUTION NETWORK, which is incorporated herein by reference in its entirety.

TECHNICAL FIELD

This disclosure relates to an electrical connector for a medium-power or high-power electrical distribution network.

BACKGROUND

An electrical connector is used to connect electrical transmission and distribution equipment and electrical sources within an electrical system.

SUMMARY

In one general aspect, an electrical connector includes: a housing including a mechanical interface, the mechanical interface configured to mechanically connect the electrical connector to a bushing; a current path in the housing, the current path including: an electrical conductor; and a switching apparatus electrically connected to the electrical conductor, the switching apparatus associated with operating states, the operating states including at least a first state that closes the current path and a second state that opens the current path; a switch control apparatus in the housing, the switch control apparatus configured to control the operating state of the switching apparatus; and a power apparatus in the housing, the power apparatus configured to obtain electrical energy from the current path and provide electrical energy to the switch control apparatus.

Implementations may include one or more of the following features. The switching apparatus may be a vacuum interrupter, and the switch control apparatus may be an actuator that is configured to control a position of a moveable contact of the vacuum interrupter relative to a stationary contact of the vacuum interrupter. The operating states of the vacuum interrupter include an open state and a closed state, the stationary contact and the moveable contact are not connected to each other in the open state, and the stationary contact and the moveable contact are connected to each other in the closed state. The power apparatus may be a current transformer that includes: an input coil that is configured to magnetically couple to the current path, and an output that is electrically connected to the actuator such that the output of the current transformer provides electrical power to the actuator.

The housing may include a first portion that extends in a first direction, and a second portion that extends in a second direction; the mechanical interface may extend in the first direction from an end of the first portion; and the switching apparatus may be in the second portion. The switching apparatus may include an actuator, and the actuator may be in the second portion. The housing also may include a compartment that extends from the second portion, and the power apparatus may be in the compartment. The first direction and the second direction may be orthogonal directions, and, in these implementations, when the mechanical interface is attached to the bushing: the first portion extends horizontally, the second portion and the switching apparatus extend vertically, and the power apparatus is under the first portion.

The housing may include a first portion that extends in the first direction; the mechanical interface may extend in the first direction from a first end of the first portion; and the electrical conductor, the switching apparatus, and the switch control apparatus may be in the first portion. The housing also may include a compartment that extends from the first portion in a second direction; and the power apparatus may be in the compartment. In some implementations, when the mechanical interface is attached to the bushing, the switching apparatus extends horizontally.

The electrical connector also may include an electronic controller configured to control the switch control apparatus. At least part of the electronic controller may be in the housing. The electronic controller may be configured to communicate with a separate electronic device that is outside of the housing.

The housing may include at least a first piece and a second piece, the first piece may be configured to be connected to and disconnected from the first piece to allow access to an interior of the housing, and, when the first piece is connected to the second piece, the switch control apparatus, the switching apparatus, and the power apparatus may be enclosed in the housing. The first piece may cover a first side of the switching apparatus, and the second piece may cover a second side of the switching apparatus. The first piece may be an electrically insulating and moldable rubber material, and the second piece may be a rigid polymer material.

The electrical connector also may include an internal structure that holds the switching apparatus, the actuator, and the power apparatus in a fixed spatial relationship with each other. The internal structure may be a rigid structure that is in the housing.

The electrical conductor may be a spring-loaded tulip.

The electrical connector also may include an opening that passes through the housing, the opening configured to allow air to flow into and out of an interior of the housing.

In another general aspect, a system includes a utility cabinet, the utility cabinet including: a wall, and a bushing that extends from the wall; and an electrical connector, the electrical connector including: a housing including a connection interface configured to connect the electrical connector to the bushing; a current path in the housing, the current path including: an electrical conductor, and a switching apparatus electrically connected to the electrical conductor, the switching apparatus associated with operating states, the operating states including at least a first state that closes the current path and a second state that opens the current path; a switch control apparatus in the housing, the switch control apparatus configured to control the operating state of the switching apparatus; and a power apparatus in the housing, the power apparatus configured to obtain electrical energy from the current path and provide electrical energy to the switch control apparatus.

Implementations may include one or more of the following features. The wall may extend in a plane, and, when the connection interface is connected to the bushing, the switching apparatus may be substantially parallel to the plane or substantially perpendicular to the plane.

In another general aspect, an electrical connector includes: a housing including: a first portion; a second portion that is configured to be repeatedly attached and removed from the first portion; and a mechanical interface, the mechanical interface configured to mechanically connect the electrical connector to a bushing. The electrical connector also includes: a current path in the housing, the current path including: an electrical conductor, and a switching apparatus electrically connected to the electrical conductor, the switching apparatus associated with operating states, the operating states including at least a first state that closes the current path and a second state that opens the current path. When the first portion and the second portion are attached, the housing surrounds the switching apparatus, and, when the second portion is removed from the first portion, the switching apparatus and an interior of the housing are accessible.

Implementations of any of the techniques described herein may include a system, an assembly, an electrical connector, and/or a method. The details of one or more implementations are set forth in the accompanying drawings and the description below. Other features will be apparent from the description and drawings, and from the claims.

DRAWING DESCRIPTION

FIG. 2B is a side cross-sectional view of the electrical connector of FIG. 2A.

FIG. 3 is a block diagram of an example of an electrical device.

FIG. 4A is a perspective view of an outer region of an example of a support structure.

FIG. 4B is a perspective view of an inner region of the support structure of FIG. 4A.

FIG. 5A is a cross-sectional view of another example of an electrical connector.

FIG. 5B is an end view of a mechanical interface of the electrical connector of FIG. 5A.

FIG. 8A is a cross-sectional view of another example of an electrical connector.

FIG. 8B is a perspective view of the electrical connector of FIG. 8A.

FIGS. 10 and 11 are cross-sectional views of other examples of electrical connectors.

DETAILED DESCRIPTION

Figure 1A:
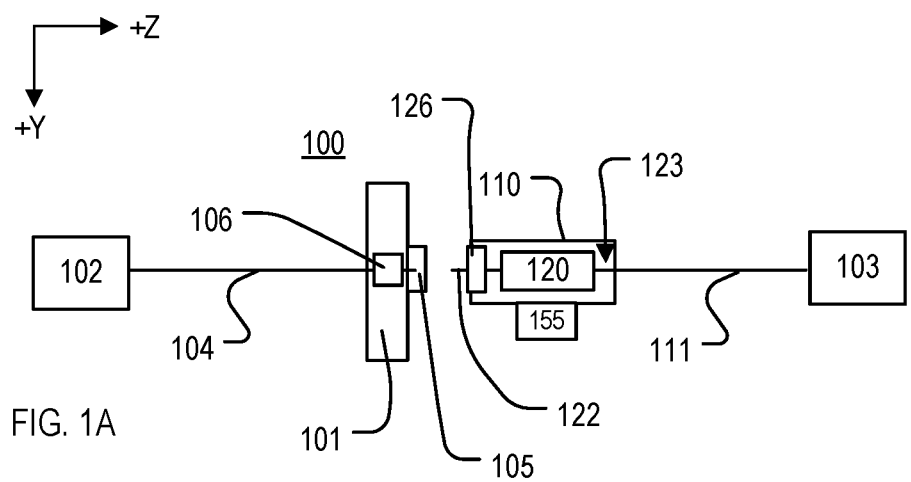
FIG. 1A is a block diagram of an example of an electrical power system.

FIG. 1A is a block diagram of an alternating current (AC) electrical power system 100 that includes an electrical connector 110. The electrical connector 110 is a relatively compact device that an operator can position and install manually, and the electrical connector 110 is generally small and light enough to be manually moveable, with, for example, a hotstick. The electrical connector 110 may have a current rating of 200 Amperes (A), 400 A, 600 A, between 200 A and 600 A, or greater than 600 A. The electrical connector 110 may be configured to have an AC operating voltage of, for example, 15 kilovolts (kV), 25 kV, 27 kV, 35 kV, 38 kV, or greater.

The electrical connector 110 includes a resettable current interrupting device 120 on a current path 123. The resettable current interrupting device 120 has an open state in which current cannot flow in the current path 123 and a closed state in which current can flow in the current path 123. The resettable current interrupting device 120 is capable of conducting current and interrupting current, and is also capable of being reset or controlled to conduct current after interrupting current flow. In other words, the resettable current interrupting device 120 can conduct current under ordinary conditions, open and interrupt current flow (for example, in the presence of a fault condition), and then be closed again such that current flow may resume in the current path 123. Thus, unlike a fuse or other type of non-resettable current interrupting device, the resettable current interrupting device 120 does not have to be replaced after interrupting current. A vacuum interrupter is an example of a component of a resettable current interrupting device.

The electrical connector 110 provides resettable current interrupting functionality in a relatively compact arrangement that can be manually installed on and removed from a bushing 105 of an external electrical device or structure 101. Furthermore, the electrical connector 110 may be implemented in a variety of arrangements. For example, some implementations of the electrical connector 110 are parallel arrangements in which the resettable current interrupting device 120 extends generally along the same direction as the bushing 105 extends (the Z axis in the example of FIG. 1A). The electrical connector 110 is an example of a parallel arrangement. FIGS. 2A, 2B, 5A, and 6 provide additional examples of parallel arrangements. In other implementations, the resettable current interrupting device 120 extends generally along a different direction than the direction in which the bushing extends 105. For example, the electrical connector 110 may be implemented such that the current interrupting device 120 extends along the Y axis. FIGS. 7A-7C, 8A, 8B, 9, 10, and 11 provide examples of non-parallel arrangements. The variety of configurations and arrangements provide an end-user with a greater number of options to meet the requirements of their particular application.

Moreover, the electrical connector 110 includes a power apparatus 155 that harvests or obtains electrical energy from electrical current that flows in the current path 123 and provides the harvested energy to various components within the electrical connector 110. Thus, the electrical connector 110 is self-powered and the various components within the electrical connector 110 can operate when electrical current is not flowing in the current path 123.

An overview of the system 100 and the electrical connector 110 is provided before discussing various other implementations and arrangements of the electrical connector 110.

The system 100 includes an AC power source 102 and a distribution path 104. The electrical power system 100 may be, part of, for example, an electrical grid, an electrical system, or a multi-phase electrical network that distributes electricity to industrial, commercial, and/or residential customers. The electrical grid may have an operating voltage of, for example, at least 1 kilovolt (kV), 12 kV, up to 34.5 kV, up to 38 kV, or 69 kV or higher, and may operate at a system frequency of, for example, 50 or 60 Hertz (Hz). All or portions of the grid may be underground. The distribution path 104 is any type of mechanism or device that carries electricity. For example, the distribution path 104 may include one or more transmission lines, electrical cables, electrical wires, transformers, or a combination of such devices. The source 102 is any device capable of providing AC electricity to the distribution path 104. For example, the source 102 may be a generator, a substation, a renewable energy source, a capacitor bank, a transformer, a power station, or any other type of electrical equipment that generates and/or transfers electrical energy.

The electrical connector 110 includes a mechanical interface 126 that is attachable to and removable from the bushing 105. The mechanical interface 126 surrounds a conductor 122 that is electrically connected to the resettable current interrupting device 120. The current path 123 includes the conductor 122 and the current interrupting device 120. The resettable current interrupting device 120 is also electrically connected to a load 103 via a load-side conductor 111. The load 103 is any type of device that utilizes, produces, and/or stores electricity. For example, the load 103 may be machinery, a lighting system, one or more motors, a transformer, or a combination of such devices. The load 103 may be a device that is capable of producing, consuming, and/or storing electricity. For example, the load 103 may be a battery.

The bushing 105 is on an electrical device or structure 101 that is separate and distinct from the electrical connector 110. For example, device or structure 101 may be a transformer, a sectionalizing cabinet, or a junction. The bushing 105 surrounds an electrical conductor 106 that is part of the distribution path 104. The mechanical interface 126 is configured such that, when the mechanical interface 126 is mounted to the bushing 105, the electrical connector 110 is held to the bushing 105 and the electrical conductor 122 is electrically connected to the conductor 106 and the distribution path 104. When the current interrupting device 120 is in the closed state, current flows in the current path 123, and the source 102 is electrically connected to the load 103. When the current interrupting device 120 is in the open state, current does not flow in the current path 123, and the source 102 is disconnected from the load 103.

Figure 1B:
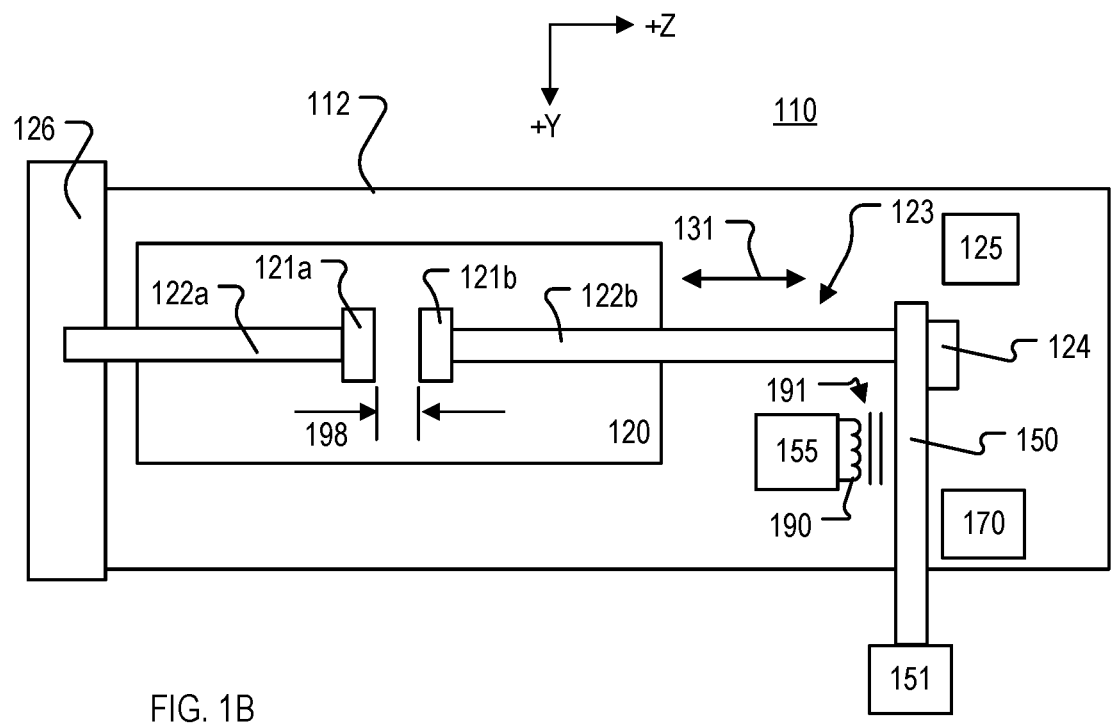
FIG. 1B is a block diagram of an electrical connector that may be used in the electrical power system of FIG. 1A.

FIG. 1B is a block diagram that shows additional details of the electrical connector 110. In the example shown in FIG. 1B, the resettable current interrupting device 120 is a vacuum interrupter and is referred to as the vacuum interrupter 120.

The electrical connector 110 includes a housing 112 made of an electrically insulating material, such as, for example, hardened rubber, a polymer material, or a molded peroxide-cured EPDM. The mechanical interface 126 is at an end of the housing 112. The mechanical interface 126 may be part of the housing 112. The housing 112 is made of an electrically insulating material, such as, for example, rubber. The housing 112 encloses the vacuum interrupter 120, a switch control 124, the power apparatus 155, and a sensor system 170. The electrical connector 110 also includes a control system 125. The control system 125 may be enclosed within the housing 112 or embedded in a side of the housing 112 with a user interface that is accessible from an exterior of the housing 112.

The vacuum interrupter 120 includes a stationary contact 121a and a moveable contact 121b. The contact 121a is at an end of a stationary rod 122a, and the moveable contact 121b is at an end of a moveable rod 122b. The contacts 121a and 121b and the rods 122a and 122b are made of an electrically conductive material such as, for example, copper, brass, tin, silver, gold, or a combination of such materials. When the contacts 121a and 121b are physically separated by a gap 198 (such as shown in FIG. 1B), current cannot flow through the vacuum interrupter 120 and the vacuum interrupter 120 is in the opened state. When the contacts 121a and 121b are in physical contact, current may flow through the vacuum interrupter 120 and the vacuum interrupter 120 is in the closed state.

The electrical connector 110 also includes a current exchange 150. The current exchange 150 is an electrically conductive element. One end of the current exchange 150 is attached to the moveable rod 122b and another end of the current exchange 150 is attached to an electrically conductive current port 151. The attachment points may be formed by soldering, welding, brazing, or any other technique that forms an electrical connection between two conductive elements. The current exchange 150 is able to move with the moveable rod 122b without becoming disconnected from the moveable rod 122b or the current port 151. For example, the current exchange 150 may be a flexible metal wire, a flexible metal cable, a metal strip, flexible braided wires, or a metal spring. In some implementations, the current exchange 150 is a laminated copper strip. The current port 151 is made of an electrically conductive material such as a metal or a metal alloy. In some implementations, the current port 151 is a braided copper cable, or a braided cable made of another metal. The current port 151 is configured to be attached to a separate device, such as, for example, the load-side conductor 111. The stationary rod 122a, the stationary contact 121a, the moveable contact 121b, the moveable rod 122b, the current exchange 150, and the current port 151 form the current path 123 through the electrical connector.

The switch control 124 is coupled to the moveable rod 122b and is controllable to cause the moveable rod 122b and moveable contact 121b to move relative to the stationary rod 122a and the stationary contact 121a. Thus, the switch control 124 controls the state of the vacuum interrupter 120. The switch control 124 may be, for example, an actuator. Any type of actuator may be used as the switch control 124. For example, the switch control 124 may be an electromagnetic actuator or a hydraulic actuator.

The power apparatus 155 harvests electrical energy from the current path 123 and provides electrical energy to the switch control 124. In the example shown in FIG. 1B, the power apparatus 155 is a current transformer (CT) that includes a coil 190 and a magnetic core 191. When electrical current flows in the current path 123, the magnetic core 191 magnetically couples the coil 190 to the current exchange 150, and an electrical current is induced in the coil 190. The induced current that flows in the coil 190 is stored, for example, in a capacitor. The power apparatus 155 may step-down or reduce the magnitude of the current that flows in the current path 123 such that harvested current may be stored and used to power relatively low voltage components of the electrical connector 110.

The sensor system 170 measures one or more properties of the electrical current that flows in the current path 123. For example, the sensor system 170 may be positioned to measure one or more properties of the electricity that flows in the current exchange 150. The sensor system 170 may include a current sensor, such as a Rogowski coil, that measures the amount of current in the current path 123. In some implementations, the sensor system 170 includes a voltage sensor and a resistive element that has a known impedance. In these implementations, the resistive element is electrically connected to the current path 123, and the voltage sensor measures the voltage across the resistive element. The sensor system 170 also produces data, such as one or more indications of the measured properties.

The control system 125 is coupled to the sensor system 170, the switch control 124, and the power apparatus 155. The power apparatus 155 may provide electrical power to the control system 125. The control system 125 controls the operation of the switch control 124 and processes data produced by the sensor system 170. A control system 1325, which may be used as the control system 125, is discussed further with respect to FIG. 13.

Figure 2A:
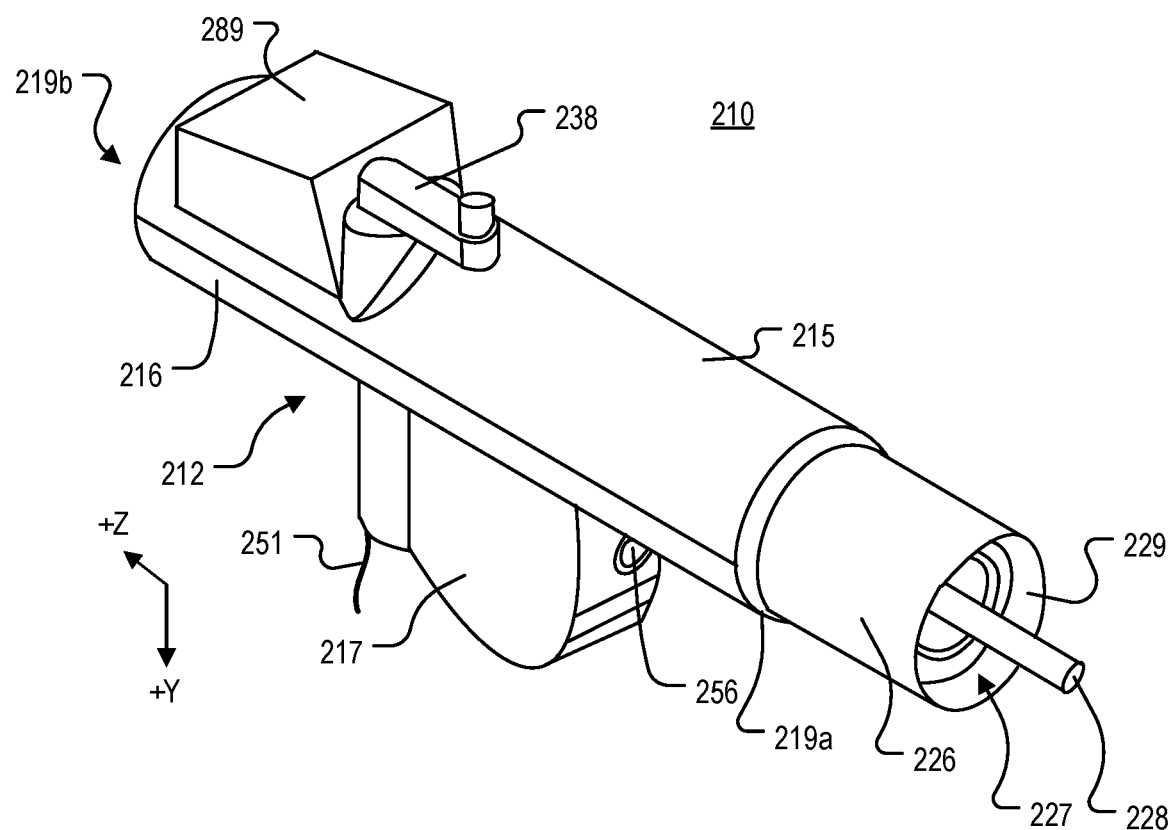
FIG. 2A is a perspective view of an example of an electrical connector.

FIG. 2A is a perspective view of an electrical connector 210. FIG. 2B is a side cross-sectional view of the electrical connector 210. The electrical connector 210 is an example of a parallel arrangement.

The electrical connector 210 includes a housing 212. The housing 212 includes a main body 216 and a cover 215. When the cover 215 is attached to the housing 212, the cover 215 and the main body 216 form an interior space 213. The main body 216 extends along the +Z direction from a first end 219a to a second end 219b. The main body 216 is substantially a truncated cylinder in shape, and a mechanical interface 226 extends from the first end 219a in the −Z direction. The vacuum interrupter 120, a support structure 460, a power apparatus 255, an actuator 224, and a sensor system 270 are in the main body 216.

The housing 212 also includes a compartment 217 that extends in the +Y direction from the main body 216. The compartment 217 and the main body 216 are a single piece of electrically insulating material. The compartment 217 encloses the power apparatus 255 and the sensor system 270. The power apparatus 255 may be a current transformer (CT), and may be similar to the power apparatus 155 (FIG. 1B).

The compartment 217 also defines a vent opening 256. The vent opening 256 passes through the housing 212 and allows gas (such as air) to flow into and out of the compartment 217 and the interior space 213. The vent opening 256 allows hot air and gasses to flow out of the interior space 213 and helps to maintain the temperature in the interior space 213 such that the power apparatus 255, the sensor system 270, and other components of the electrical connector 210 operate in a safe and efficient manner. The vent opening 256 may hold a venting structure, such as a screen or filter, that partially fills the vent opening 256 but allows fluid flow. The venting structure helps to prevent debris from entering the interior space 213 while still allowing hot air and gasses to escape from the interior space 213.

The cover 215 is mounted to the main body 216 in any manner that allows the cover 215 to be removed from and attached to the main body 216 repeatedly and without damaging the main body 216 or the cover 215. For example, the main body 216 may include one or more recesses that receive and hold corresponding posts on the cover 215 with an interference fit. In another example, the main body 216 includes connections that are configured to engage with corresponding connections on the cover 215 in a snap-fit connection. In these implementations, the cover 215 is removed from the main body 216 by applying a force on the cover 215 in the —Y direction until the cover 215 separates from the main body 216. The cover 215 may include a graspable handle or post to facilitate removal and placement of the cover 215. In some implementations, a portion of the cover 215 is attached to the main body 216 by a hinge. In these implementations, the cover 215 swings about the hinge when removed from the main body 216. The removable configuration of the cover 215 enables an operator or end-user to quickly and easily make adjustments to the vacuum interrupter 120 and/or other components in the interior space 213.

The cover 215 also includes an indicator window 254 (FIG. 2B). The indicator window 254 is a transparent or translucent element formed in the cover 215. The indicator window 254 allows observation of the interior space 213 without removing the cover 215. The cover 215 also defines a control compartment 289 that accommodates a control system 225. An implementation of the control system 225 is discussed with respect to FIG. 13. The control compartment 289 may include a window, display, buttons, or other interface that allows interaction with the control system 225 while the cover 215 is attached to the main body 216. The mechanical interface 226 defines a recess 227 that is configured to attach to a bushing 305 of a separate device 301. FIG. 3 is a side block diagram of the separate device 301.

The cover 215 is made of any solid electrically insulating material. For example, the cover 215 may be made of a hardened polymer or a thermoset. A thermoset is a polymer that is hardened by curing a non-hardened polymer material such as a soft solid polymer, a viscous liquid pre-polymer, or a resin by heating and/or irradiating the non-hardened polymer material. The main body 216, the compartment 217, and the mechanical interface 226 are also made of an electrically insulating material. For example, main body 216, the compartment 217, and the mechanical interface 226 may be hardened rubber, a polymer material, or a molded peroxide-cured EPDM.

The electrical connector 210 also includes the electromagnetic actuator 224. The electromagnetic actuator 224 is a device that converts electrical energy into mechanical motion. In the example of FIGS. 2A and 2B, the electromagnetic actuator 224 is implemented as an electromagnetic plunger that includes a coil 241, a magnetic core 242, a spring 243, and a magnetic plunger 244. The magnetic plunger 244 is concentric with the magnetic core 242. When a transient current flows in the coil 241, a magnetic field is formed around the magnetic core 242 and the magnetic plunger 244. The magnetic field produces an interaction between the magnetic core 242 and the magnetic plunger 244, and the plunger 244 moves relative to the magnetic core 242. To place the vacuum interrupter 120 in the closed state, current flows in the coil 241 to cause the magnetic plunger 244 to move in the −Z direction. The plunger 244 is coupled to an electrically insulating push rod 235, which moves in the −Z direction with the plunger 244. The push rod 235 is mechanically connected to the moveable rod 122b.

When the push rod 235 moves in the −Z direction, the moveable rod 122b also moves the moveable rod 122b in the −Z direction until the moveable contact 121b makes contact with the stationary contact 121a. The actuator 224 holds the moveable contact 121b in contact with the stationary contact 121a until the vacuum interrupter 120 transitions out of the closed state. To transition to the vacuum interrupter to the opened state, the actuator 224 is controlled such that the magnetic plunger 244 moves in the +Z direction, which causes the moveable contact 121b and the moveable rod 122b to also move in the +Z direction. The moveable contact 121b separates from the stationary contact 121a to open the vacuum interrupter 220. When the vacuum interrupter 120 is open, current cannot flow from the current port 251 to the stationary rod 122a.

The electromagnetic actuator 224 also includes a manual control device 238. The manual control device 238 allows an end-user to manually operate the electromagnetic actuator 224. For example, the end-user may use the manual control device 238 to cause the plunger 244 to move the push rod 235. The manual control device 238 is accessible from the exterior of the electrical connector 210 and is on the cover 215. The manual control device 238 may be implemented in other ways. For example, the manual control device 238 may extend from the end 219b.

Referring also to FIGS. 4A and 4B, the electrical connector 210 also includes a support structure 460 that holds the vacuum interrupter 120, the actuator 224, and the power apparatus 255. The support structure 460 is within the main body 216 of the housing 212. FIG. 4A is a perspective view of the outer region 461a of the support structure 460. FIG. 4B is a perspective view an inner region 461b of the support structure 460. The support structure 460 is generally a truncated cylinder that has a curved exterior surface 465a that extends from a first end 466a to a second end 466b in the –Z direction. When the support structure 460 is in the housing 212, the curved exterior surface 465a faces an inner wall 239 of the housing 212. The curved exterior surface 465a may make contact with the inner wall 239. The power apparatus 255 is held in a bracket 462 that extends from the curved exterior surface 465a. The power apparatus 255 may be held in the bracket 462 with one or more fasteners such as screws and/or an adhesive.

The support structure 460 also includes a sensor bracket 464. The sensor bracket 464 extends outward from the curved exterior surface 465a. The sensor bracket 464 defines an opening 463 that passes through the sensor bracket 464. As shown in FIG. 2B, when the support structure 460 is in the electrical connector 210, the current port 251 passes through the opening 463. The sensor bracket 464 also holds the sensor system 270 (FIG. 2B). The sensor system 270 is any type of sensor or any collection of sensors that are able to measure electrical current or a quantity that is related to electrical current in the current port 251. The sensor system 270 may be, for example, a Rogowski coil.

The support structure 460 also includes an opening 468. The opening 468 passes through the support structure 460 from the curved exterior surface 465a to an inner wall 465b. The inner wall 465b is also curved and extends from the end 466a to the end 466b. The support structure 460 also includes an inner bracket 467 that extends from the inner wall 465b. The inner bracket 467 is configured to hold the vacuum interrupter 120 in a space 469 that is between the inner bracket 467 and the end 466b. The support structure 460 also includes an annulus 475 at the end 466b. The annulus 475 defines an opening 476. The opening 476 is sized to accommodate a conductor 228 (FIGS. 2A and 2B), which is electrically connected to the stationary rod 122a. When the vacuum interrupter 120 is held in the support structure 460, the conductor 228 extends through the opening 476. The support structure 460 also includes features 477, which are formed in the inner wall 465b at the end 466a. In the example shown in FIG. 4B, the features 477 are slots that help hold the actuator 224. The features also increase the creepage length of the support structure.

The support structure 460 may be made of any rigid material that is electrically insulating and maintains its material properties in a high-temperature environment (such as the temperatures that may exist in the electrical connector 210 during a fault condition). For example, the support structure 460 may be made of a rigid, molded polymer or plastic. The support structure 460 may be made of a thermoset polymer, such as glass-filled PPA (Polyphthalamide) or PBT (Polybutylene Terephthalate). Thermoset polymers are quite rigid and maintain their strength at the high temperatures that may exist inside the assembled electrical connector 210. The temperature inside the support structure 460 within the assembled electrical connector 210 may reach 120 to 130 degrees Celsius. The support structure 460 may be a unitary piece of material. For example, the support structure 460 may be a single molded piece of rigid plastic.

Referring also to FIG. 3, to connect the electrical connector 210 to an external electrical device 301, a bushing 305 of the device 301 is inserted into the recess 227. The recess 227 and the bushing 305 have the same shape and are substantially the same size. The electrical connector 210 is held to the device 301 by an interference fit between the bushing 305 and the wall 229. The bushing 305 surrounds an electrical conductor 306. When the electrical connector 210 is mounted to the bushing 305, the conductor 228 and the moveable rod 122a are electrically connected to the electrical conductor 306 of the device 301.

Under ordinary operating conditions, the vacuum interrupter 120 is in the closed state, and the contacts 121a and 121b are in physical contact with each other. Electrical current flows in a current path 223 that includes the conductor 228, the stationary rod 122a, the stationary contact 121a, the moveable contact 121b, the current exchange 250, the power apparatus 255, and the current port 251. The sensor system 270 measures one or more properties of the electrical current that flows in the current port 251 and provides an indication of the measured properties to the control system 225. Additionally, the power apparatus 255 harvests electrical power from the current path 223 and stores the harvested electrical power (for example, in a capacitor). When the vacuum interrupter 120 is in the closed state, the control system 225, the electromagnetic actuator 224, and the sensor system 270 may be powered by the electricity that flows in the current path 223 or by electrical energy that is stored in the power apparatus 255. When the vacuum interrupter 120 is in the opened state, electrical current does not flow in the current path 223, and the power apparatus 255 provides power to the control system 225, the electromagnetic actuator 224, and the sensor system 270.

FIG. 5A is a side cross-sectional view of an electrical connector 510. The electrical connector 510 is another example of a parallel configuration. The electrical connector 510 includes a housing 512 that encloses the vacuum interrupter 120, an actuator 524, and a push rod 535. The push rod 535 is an electrically insulating rod. In the example of FIG. 5A, the push rod 535 includes sheds that extend radially outward from the rod. The sheds increase the effective insulating length of the push rod 535 such that the push rod 535 is relatively compact, thus decreasing the overall size of the electrical connector 510. The housing 512 is substantially cylindrical and extends in the +Z direction from an end 519a to an end 519b. The housing 512 is made of an electrically conductive material such as, for example, hardened rubber, a polymer material, or a molded, peroxide-cured EPDM.

The moveable rod 122b is electrically connected to a current exchange 550. The current exchange 550 is an electrically conductive element that is also connected to a current port 551. The current exchange 550 is any type of element that is capable of moving with the moveable rod 122b, such as, for example, a spring or a laminated strip of metal. The current exchange 550 extends into an opening 568 in the housing 512. The electrical connector 510 also includes a sensor 570 that measures the electrical current in the current exchange and/or the current port 551. In the example shown in FIG. 5A, the sensor 570 includes a ring or coil that surrounds the current exchange 550 and the current port 551. The sensor 570 may be, for example, a Rogowski coil.

The electrical connector 510 also includes a removable cap 515 that is attached to the end 519b of the housing 512. The removable cap 515 is made of an electrically insulating material and may be made of the same material as the housing 512. The removable cap 515 includes a base portion 515a and a handle portion 515b that, with the base portion 515a, forms an open region 515c. The open region 515c is sized to allow interaction with the electrical connector 510. For example, the handle portion 515b may be sized and shaped such that the open region 515c allows a human operator to grasp the cap 515 easily or to grab the handle portion 515b with the hook of a hotsick.

The base portion 515a is held to the end 519b with fasteners 514. The fasteners 514 may be, for example, screws, bolts, pegs, rods, or any other type of securing device. When the base portion 515a is attached to the end 519b, the housing 512 and the removable cap 515 enclose the vacuum interrupter 120 and the actuator 524. To remove the cap 515, the fasteners 514 are loosened or removed, and the base portion 515a is separated from the end 519b. When the cap 515 is removed, an operator or end user is able to access the actuator 524 and the vacuum interrupter 120.

The electrical connector 510 also includes a mechanical interface 526 at the end 519a. FIG. 5B is shows the mechanical interface 526 from a viewpoint indicated by the line 5B-5B'. The mechanical interface 526 has a circular cross-section in the X-Y plane. The mechanical interface 526 defines a recess 527. A conductor 528, which is electrically connected to the stationary rod 122a, extends into the recess 527. A tulip contact 593 is at an end 532 of the conductor 528. The tulip contact 593 is made of an electrically conductive material such as, for example, a metal or a metal alloy. The tulip contact 593 includes a plurality of fingers 594 that extend outward from the end 532 and define an open region that is configured to receive an external conductor.

The electrical connector 510 is configured to connect the load 103 to the device 101 (FIG. 1A). To connect the electrical connector to the device 101, the bushing 105 is inserted into the recess 527. The fingers 594 of the tulip connector 593 surround the end of the electrical conductor 106 that is in the bushing 105. The fingers 594 improve the electrical contact between the electrical conductor 528 and the electrical conductor 106.

Figure 6:
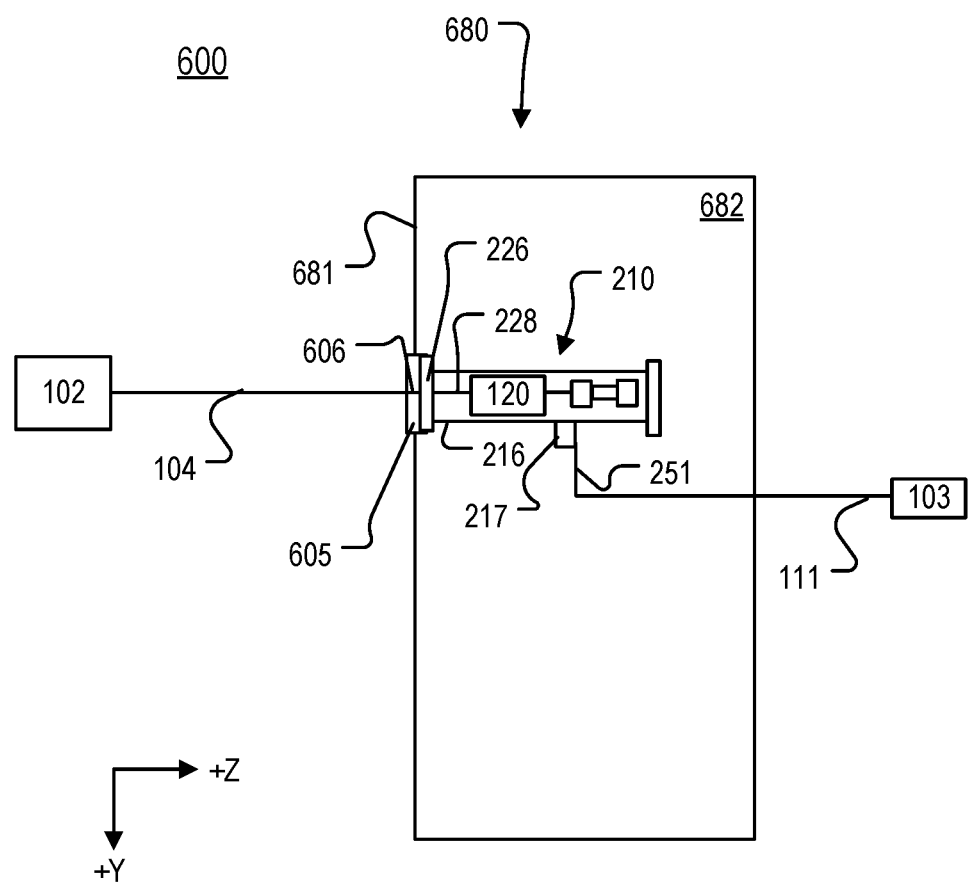
FIG. 6 is a block diagram of an example of a system that includes a utility cabinet.

FIG. 6 is a cross-sectional block diagram of a system 600. The system 600 includes a cabinet 680. The cabinet 680 is a three-dimension body that includes a plurality of walls or sides (including a wall 681) that define a cabinet interior 682. The wall 681 extends generally in the X-Y plane. A bushing 605 extends through the wall 681. The bushing 605 surrounds a conductor 606 that is electrically connected to the distribution path 104.

The electrical connector 210 (FIGS. 2A and 2B) is installed in the cabinet interior 682. The mechanical interface 226 is mounted on the bushing 605. The mechanical interface 226 is configured such that, when the mechanical interface 226 is mounted on the bushing 605, the conductor 228 is electrically connected to the conductor 606. For example, the mechanical interface 226 may have a diameter in the X-Y plane that is slightly smaller than a diameter of the bushing 605 such that the mechanical interface 226 is held to the bushing 605 with an interference fit. Additionally, the conductor 606 may be concentric with the bushing 605, and the conductor 228 may be concentric with the mechanical interface 226. In these implementations, the conductor 228 and the conductor 606 are aligned along the Z direction when the mechanical interface 226 is mounted to the bushing 605 and become electrically connected when the mechanical interface 226 is attached to the bushing 605.

When the mechanical interface 226 is attached to the bushing 605, the electrical connector 210 extends from the wall 681 in the +Z direction and into the cabinet interior 682. In the example shown, the wall 681 is substantially parallel to the direction of gravity. The body 216 and the vacuum interrupter 120 are oriented horizontally (substantially perpendicular to the local gravity vector). The compartment 217 and the power apparatus 255 (which is in the compartment) are oriented below the body 216 and extend generally in the +Y direction. The load-side conductor 111 is electrically connected to the current port 251, which also extends in the +Y direction. The orientation of the current port 251 helps to improve the stability of the electrical connector 210.

Figure 7A:
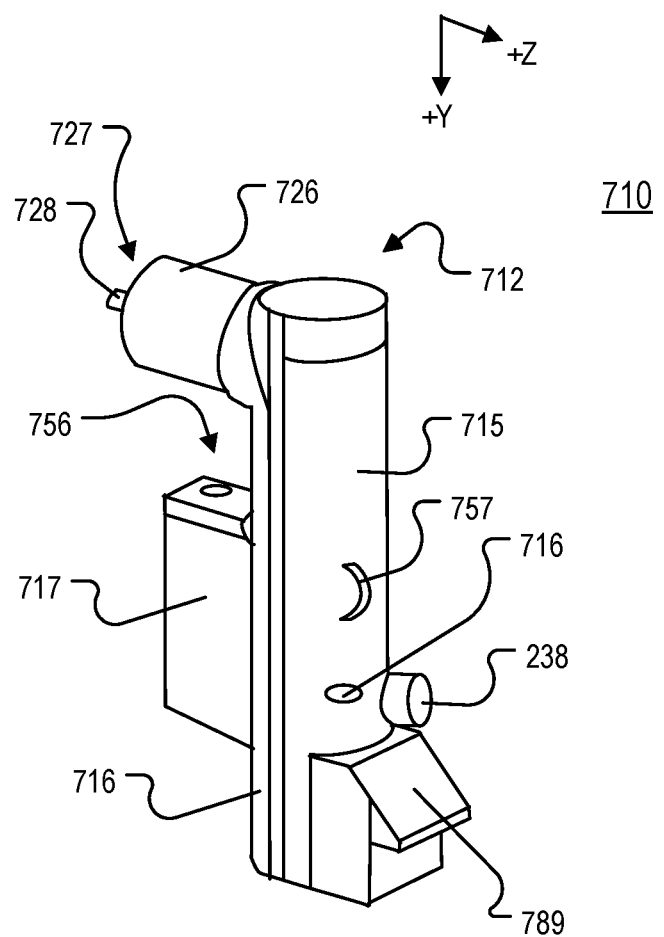
FIG. 7A is a perspective view of another example of an electrical connector.
Figures 7B, 7C:
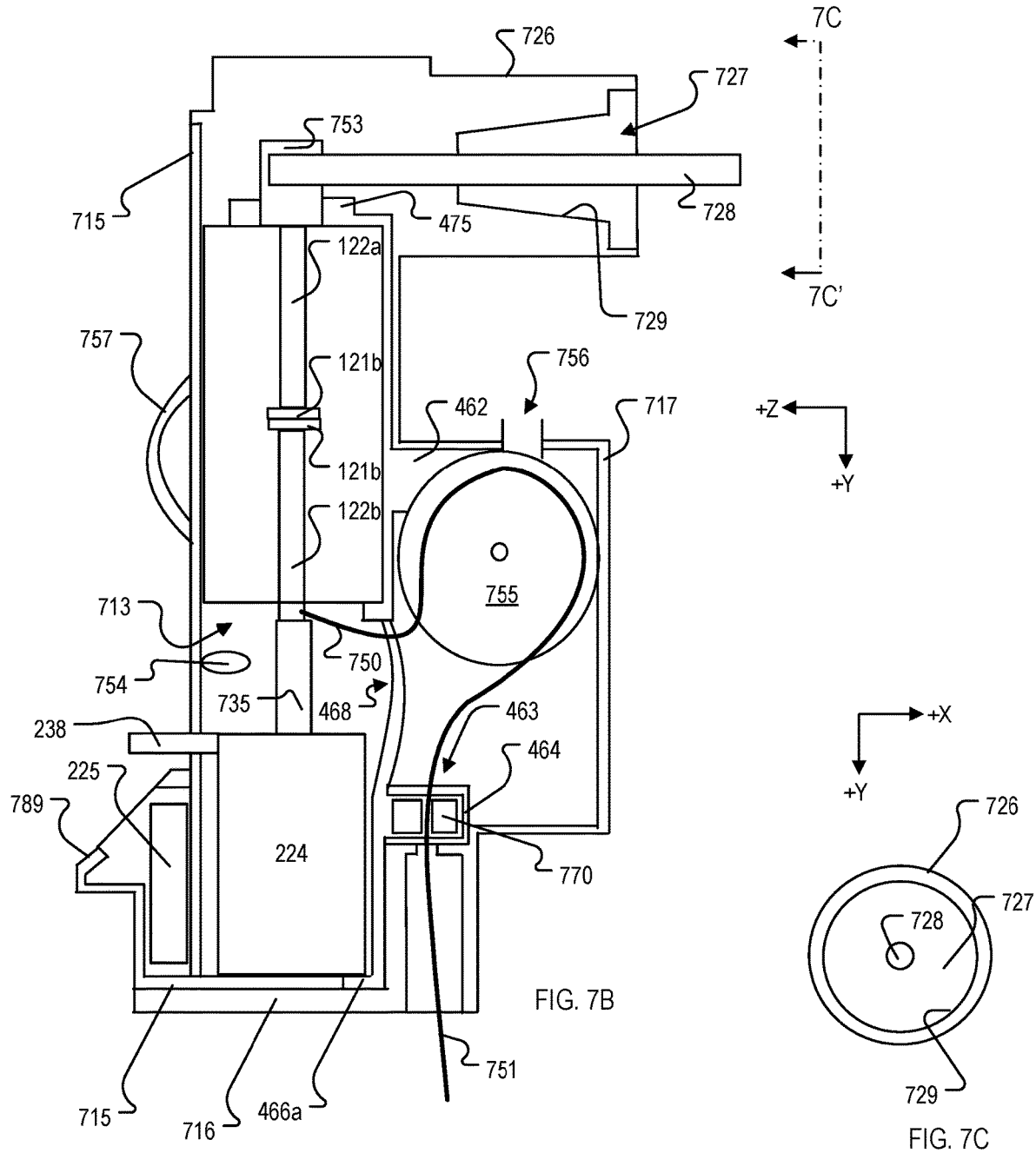
FIG. 7B is a cross-sectional view of the electrical connector of FIG. 7A.
FIG. 7C is an end view of a mechanical interface of the electrical connector of FIG. 7A.

Referring to FIGS. 7A-7C, an electrical connector 710 is shown. The electrical connector 710 is an example of a non-parallel arrangement. FIG. 7A is a perspective exterior view of the electrical connector 710. FIG. 7B is a side-cross sectional view of the electrical connector 710. FIG. 7C is an end view of a mechanical interface 726 on the electrical connector 710 from the perspective shown by the line 7C-7C' in FIG. 7B.

The electrical connector 710 includes a housing 712. The housing 712 includes a main body 716 and a cover 715. The cover 715 is a removable cover, and the cover 715 is configured to be repeatedly removed and attached to the main body 716 without damaging the cover 715 or the main body 716. When the cover 715 is attached to the main body 716, the housing 712 defines an enclosed interior space 713. The vacuum interrupter 220, the actuator 224, a push rod 735, a current exchange 750, a power apparatus 755, and a sensor system 770 are in the main body 716 and are enclosed in the interior space 713 when the cover 715 is attached to the main body 716. The sensor system 770 is similar to the sensor systems 170, 270, and 570 discussed above. The power apparatus 755 may be a current transformer (CT) and may be similar to the power apparatus 155 (FIG. 1B).

The main body 716 includes a portion 717 that encloses the power apparatus 775 and the sensor system 770. The main body 716 also includes the mechanical interface 726, which defines a recess 727. In the example shown in FIGS. 7A and 7B, the main body 716 extends generally along the Y axis, and the portion 717 and the mechanical interface 726 extend from the main body 716 along the −Z direction. The main body 716, the portion 717, and the mechanical interface 726 are a single body of electrically insulating material. For example, the main body 716, the portion 717, and the mechanical interface 726 may be made of a hardened rubber, a polymer material, or a molded peroxide-cured EPDM.

The cover 715 also includes an indicator window 754. The indicator window 754 is a transparent or translucent element formed in the cover 715. For example, the indicator window 754 may be a clear plastic or clear polymer material. The indicator window 754 allows observation of the interior space 713 without removing the cover 715. The cover 715 also defines a control compartment 789 that accommodates the control system 225. The control compartment 789 may include a window, display, buttons, or other interface that allows interaction with the control system 225 while the cover 715 is attached to the main body 716.

The cover 715 is made of any solid electrically insulating material. For example, the cover 715 may be made of a hardened polymer or a thermoset. The cover 715 is mounted to the main body 716 in any manner that allows the cover 715 to be removed from and attached to the main body 716 repeatedly and without damaging the main body 716 or the cover 715. For example, the main body 716 may include one or more recesses that receive and hold corresponding posts on the cover 715 with an interference fit. In another example, the main body 716 includes connections that are configured to engage with corresponding connections on the cover 715 in a snap-fit connection. In these implementations, the cover 715 is removed from the main body 716 by applying a force on the cover 715 in the +Z direction until the cover 715 separates from the main body 716. The cover 715 includes a graspable handle 757. In some implementations, a portion of the cover 715 is attached to the main body 716 by a hinge. In these implementations, the cover 715 swings about the hinge when removed from the main body 716. The removable configuration of the cover 715 enables an operator or end-user to quickly and easily make adjustments to the vacuum interrupter 120 and/or other components in the interior space 713.

The portion 717 defines a vent opening 756. The vent opening 756 passes through a wall of the portion 717. The vent opening 756 allows hot air and gasses to flow out of the interior space 713 and helps to maintain the temperature in the interior space 713 such that the power apparatus 755, the sensor system 270, and other components of the electrical connector 710 operate in a safe and efficient manner. The vent opening 756 may hold a venting structure, such as a screen or filter, that partially fills the vent opening 756 but allows fluid flow. The venting structure helps to prevent debris from entering the interior space 713 while still allowing hot air and gasses to escape from the interior space 713.

The electrical connector 710 also includes the electromagnetic actuator 224. The electromagnetic actuator 224 is discussed above with respect to FIGS. 2A and 2B. In the electrical connector 710, the electromagnetic actuator 224 is positioned such that the plunger 244 moves along the Y axis to engage a push rod 735 that is mechanically mounted to the moveable rod 122b. Specifically, the plunger 244 moves in the —Y direction to cause the moveable contact 121b to join the stationary contact 121a, and the plunger moves in the +Y direction to separate the moveable contact 121b from the stationary contact 121a. The push rod 735 is made of an electrically insulating material.

The stationary rod 122a is electrically connected to a terminal 753. The terminal 753 is made from any electrically conductive material, such as, for example, copper, silver, gold, brass, tin, or a combination of such materials. The terminal 753 is electrically connected to the conductor 728. The conductor 728 extends from the terminal 753 and through the recess 727. In the example shown in FIG. 7B, the terminal 753 is configured to hold the conductor 728 substantially perpendicular to the vacuum interrupter 120.

The electrical connector 710 also includes the support structure 460, which is discussed with respect to FIGS. 4A and 4B. The support structure 460 holds the vacuum interrupter 120, the actuator 224, the power apparatus 755, and the sensor system 770. The support structure 460 is within the main body 716 of the housing 712.

To connect the electrical connector 710 to the external electrical device 301 (FIG. 3), the bushing 305 of the device 301 is inserted into the recess 727. The recess 727 and the bushing 305 have the same shape and are substantially the same size. The electrical connector 710 is held to the device 301 by an interference fit between the bushing 305 and the wall 729. When the electrical connector 710 is mounted to the bushing 305, the conductor 728 and the stationary rod 122a are electrically connected to the electrical conductor 306 of the device 301.

Under ordinary operating conditions, the vacuum interrupter 120 is in the closed state, and the contacts 121a and 121b are in physical contact with each other. Electrical current flows in a current path 123 that includes the conductor 728, the stationary rod 122a, the stationary contact 121a, the moveable contact 121b, the moveable rod 122b, a current exchange 750, the power apparatus 755, and a current port 751. The current exchange 750 is a flexible electrically conductive material that is electrically connected to the moveable rod 122b and to the current port 751. The current port 751 is an electrically conductive port or terminal that is accessible from the exterior of the electrical connector 710. The sensor system 770 measures one or more properties of the electrical current that flows in the current port 751 and provides an indication of the measured properties to the control system 225. Additionally, the power apparatus 755 harvests electrical power that passes through the power apparatus 755 and stores the harvested electrical power (for example, in a capacitor). When the vacuum interrupter 120 is in the closed state, the control system 225, the electromagnetic actuator 224, and the sensor system 270 may be powered by the electricity that flows in the current port 751 or by electrical energy that is stored in the power apparatus 755. When the vacuum interrupter 120 is in the opened state, electrical current does not flow in the current port 751, and the power apparatus 755 provides power to the control system 225, the electromagnetic actuator 224, and the sensor system 770.

FIGS. 8A and 8B show an electrical connector 810. The electrical connector 810 is another example of a non-parallel arrangement. FIG. 8A is a cross-sectional block diagram of the electrical connector 810. FIG. 8B is a perspective exterior view of the electrical connector 810.

The electrical connector 810 includes a housing 812. The housing 812 is made of an electrically insulating material, such as, for example, hardened rubber, a polymer material, or a molded peroxide-cured EPDM. The housing 812 includes a main body 816 that extends in the +Y direction from an end 816a to an end 816b. The main body 816 is a three-dimensional body and is generally cylindrical. The housing 812 also includes a portion 886 that extends outward from the main body 816. The portion 886 defines a recess 887, and the current port 851 extends into the recess 887. The portion 886 is a bushing for the current port 851. The portion 886 is generally cylindrical and is about midway between the end 816a and the end 816b. The housing 812 also includes a control compartment 889 that houses the control system 225. The control compartment 889 may be entirely enclosed, or the control compartment 889 may include a display, buttons, or other interface that is accessible from outside of the housing.

The housing 812 defines an interior space 813. The main body 816 includes a viewport 854 that allows observation of the interior space 813. The viewport 854 may be, for example, a piece of transparent plastic that is embedded in the main body 816.

The electrical connector 810 includes the vacuum interrupter 120, which is inside the main body 816. The vacuum interrupter 120 is positioned in the main body 816 between the portion 886 and the end 816b. The stationary rod 122a and the moveable rod 122b extend along the Y axis, with the stationary rod 122a (or an electrically conductive element that is connected to the moveable rod 122a) extending through the end 816b.

The moveable rod 122b is electrically connected to a current exchange 850. The current exchange 850 is electrically conductive and is configured to move with the moveable rod 122b. For example, the current exchange 850 may be a metal spring or a laminated strip of copper. The current exchange 850 is also electrically connected to a current port 851. The current port 851 extends into the portion 886. The current port 851 is an electrically conductive element and is configured to electrically connect to an external device, such as the load-side conductor 111 (FIG. 1A) or the distribution path 104 (FIG. 1A). The electrical connector 810 also includes a sensor system 870 that measures current in the current port 851. The sensor system 870 may be, for example, a current sensor such as a Rogowski coil or a current transformer.

The electrical connector 810 also includes the actuator 224, which is discussed with respect to FIG. 2B. In the configuration shown in FIG. 8A, the plunger 244 (FIG. 2B) extends along the Y axis and is mechanically coupled to an electrically insulating push rod 835. The push rod 835 is also mechanically coupled to the moveable rod 122b. Thus, the motion of the plunger 244 transfers to the moveable rod 122b and the actuator 224 controls the position of the moveable rod 122b and the moveable contact 121b. In the implementation shown in FIG. 8A, the plunger 244 is controlled to move in the +Y direction to join the moveable contact 121b and the stationary contact 121a, and to move in the —Y direction to separate the moveable contact 121b from the stationary contact 121a.

The electrical connector 810 may be used with the power system 100 (FIG. 1A). To install the electrical connector 810 in the system 100, the current port 851 is electrically connected to the conductor 106, and the portion 886 is mounted to the bushing 105. For example, the bushing 105 may be inserted into the recess 887. The stationary conductor 122a is electrically connected to the load-side conductor 111. When the electrical conductor 810 is installed in the system 100 and when the vacuum interrupter 120 is closed, electrical current flows in a current path that includes the current port 851, the current exchange 850, the moveable rod 122b, the contacts 121b and 121b, and the stationary rod 122a. The electrical connector 810 is an air-insulated connector in which air is used to provide insulation and dielectric clearance between the current path and an interior of the main body 816. An air-insulated connector (such as the electrical connector 810) is generally larger than a connector that is not air-insulated. In a connector that is not air-insulated (a solid dielectric connector), the current path and other high-voltage or high-current carrying components are embedded into the insulating housing. Although an air-insulated design may be larger than a solid dielectric design, the current path in the electrical connector 810 may be more accessible for repairs because it is not embedded into a solid dielectric material.

Figure 9:
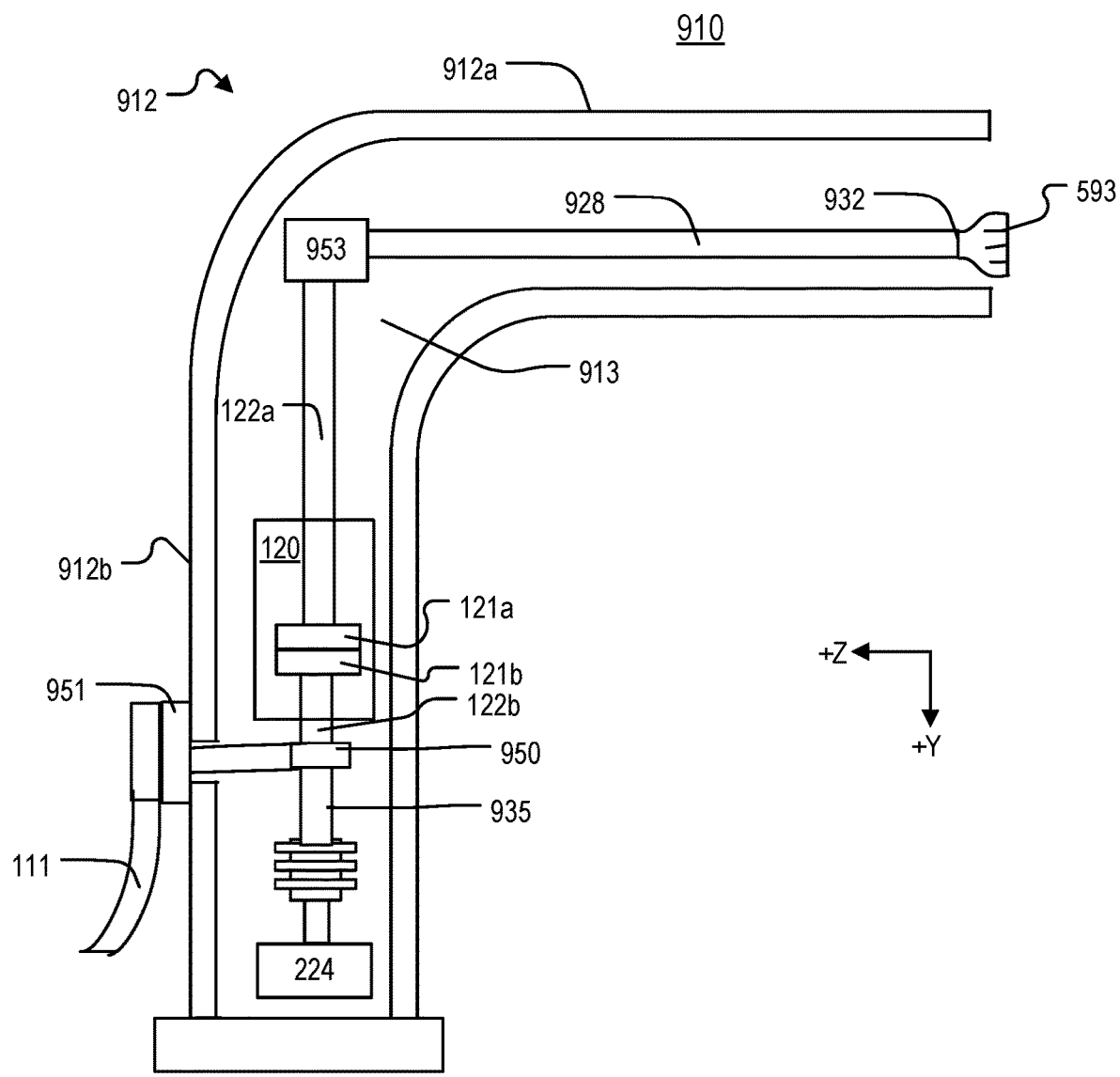
FIG. 9 is a cross-sectional view of another example of an electrical connector.

FIG. 9 is a cross-sectional side view of another non-parallel electrical connector 910. The electrical connector 910 includes a housing 912 that is substantially L-shaped. The housing 912 includes a first portion 912a that extends along the Z axis and a second portion 912b that extends along the Y axis. The first portion 912a and the second portion 912b form a single body and an interior space 913. The housing 912 is made of an electrically insulating material, such as, for example, hardened rubber, a polymer material, or a molded peroxide-cured EPDM.

The electrical connector 910 includes the vacuum interrupter 120 and the actuator 224, which are in the second portion 912b. The stationary rod 122a is electrically connected to an electrically conductive terminal 953, which is electrically connected to a conductor 928. The conductor 928 extends from the terminal 953 in the –Z direction to an end 932. The tulip connector 593 is at the end 932. The tulip connector 593 is configured to be connected to an external conductor, such as the conductor 306 (FIG. 3).

The moveable rod 122b is electrically connected to a current exchange 950. The current exchange 950 is electrically connected to a terminal 951. The terminal 951 is accessible to an exterior of the electrical connector 910 and is connected to the load-side conductor 111. The electromagnetic actuator 224 is mechanically connected to the moveable rod 122b via an insulated push rod 935. The insulated push rod 935 includes sheds that extend radially outward. The sheds increase the insulating length of the push rod 935 and help make the electrical connector 910 a compact device.

FIGS. 10 and 11 are side cross-sectional views of electrical connectors 1010 and 1110, respectively. The electrical connectors 1010 and 1110 are two other examples of non-parallel electrical connectors that may be used in the power system 100 or in the cabinet 680. The electrical connector 1010 includes a portion 1086, which is a bushing for a current port 1051. The electrical connector 1110 includes a portion 1186, which is a bushing for a current port 1151. The electrical connectors 1010 and 1110 illustrate two different ways in which the current port bushing may be arranged on the electrical connector.

The electrical connectors 1010 and 1110 include respective housings 1012 and 1112, which are made of an electrically insulating material, such as, for example, hardened rubber, a polymer material, or a molded peroxide-cured EPDM. The housing 1012 encloses the vacuum interrupter 120 and a conductor 1028 that extends substantially perpendicular to the stationary rod 122a of the vacuum interrupter 120. The conductor 1028 is electrically connected to the stationary rod 122a. The housing 1012 also encloses the actuator 224 and an insulating push rod 1035. The actuator 224 is arranged such that the plunger 244 (FIG. 2) moves along the Y axis. The insulating push rod 1035 is mechanically coupled to the plunger 244 and the moveable rod 122b of the vacuum interrupter 120.

The moveable rod 122b is electrically connected to a current exchange 1050, which is electrically connected to the current port 1051. The current port 1051 is an electrical conductive element that extends in the same direction as the conductor 1028. The portion 1086 surrounds the current port 1051 and also extends in the same direction as the conductor 1028. In other words, the conductor 1028 and the current port 1051 are on the same side of the electrical connector 1010.

Referring to FIG. 11, the housing 1112 encloses the vacuum interrupter 120 and a conductor 1128 that extends substantially perpendicular to the stationary rod 122a of the vacuum interrupter 120. The housing 1112 also encloses the actuator 224, a motion translator 1136, and an insulating push rod 1135. The actuator 224 is arranged such that the plunger 244 moves along the Z axis. The insulating push rod 1035 is mechanically coupled to the motion translator 1136 and the moveable rod 122b of the vacuum interrupter 120. The motion translator 1136 is mechanically coupled to the plunger 244. The motion translator 1136 is configured to translate the motion of the plunger 244 along the Z axis to the insulating push rod 1135 such that the insulating push rod 1135 moves along the Y axis. The motion translator 1136 may include, for example, gears, rods, and/or shafts. As compared to an implementation in which the plunger 244 moves in the same direction as the insulating push rod, the arrangement of the actuator 224 relative to the insulating push rod 1135 allows the electrical connector 1110 to have a smaller extent in the Y direction.

The moveable rod 122*b* is electrically connected to a current exchange 1150, which is electrically connected to the current port 1151. The current port 1151 is an electrical conductive element that extends parallel to but in the opposite direction as the conductor 1128. The portion 1186 surrounds the current port 1151 and also extends in the opposite direction as the conductor 1128. In other words, the conductor 1128 and the current port 1151 are on opposite sides of the electrical connector 1110.

Figure 12:
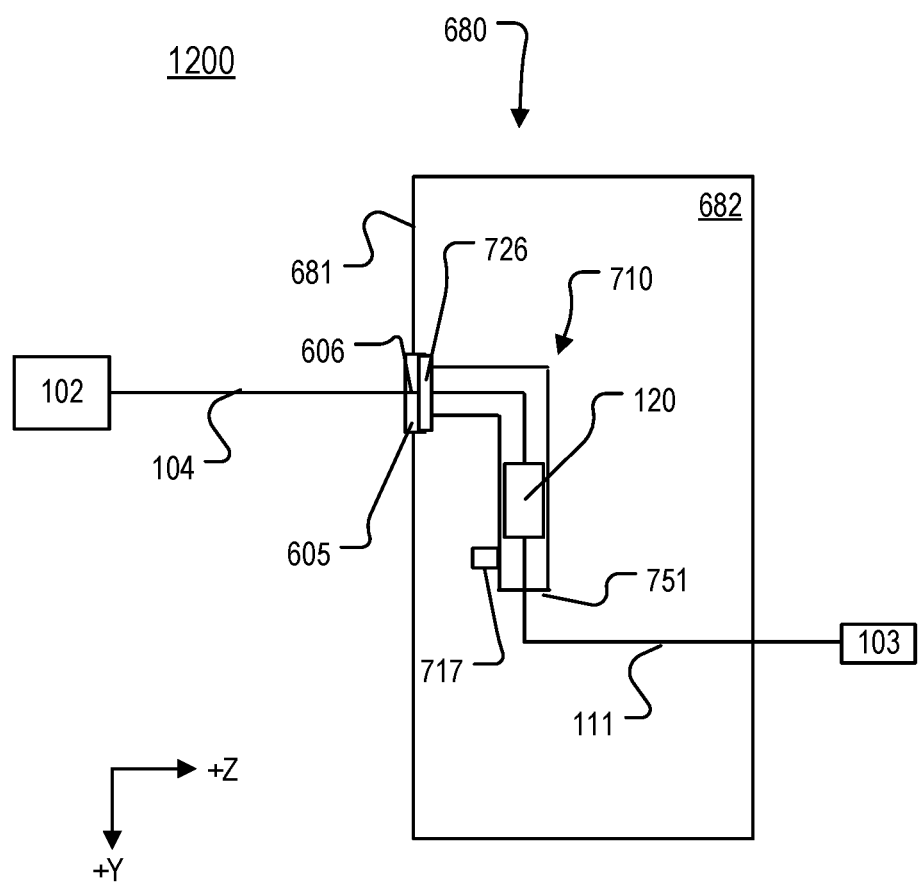
FIG. 12 is a block diagram of an example of a system that includes a utility cabinet.

FIG. 12 is a cross-sectional block diagram of a system 1200. The system 1200 illustrates an example of an arrangement of the non-parallel electrical connector 710 installed in the cabinet 680.

The mechanical interface 726 is mounted on the bushing 605. The mechanical interface 726 is configured such that, when the mechanical interface 726 is mounted on the bushing 605, the conductor 728 is electrically connected to the conductor 606. For example, the mechanical interface 726 may have a diameter in the X-Y plane that is slightly smaller than a diameter of the bushing 605 such that the mechanical interface 726 is held to the bushing 605 with an interference fit. Additionally, the conductor 606 may be concentric with the bushing 605, and the conductor 728 may be concentric with the mechanical interface 726. In these implementations, the conductor 728 and the conductor 606 are aligned along the Z axis when the mechanical interface 726 is mounted to the bushing 605 and become electrically connected when the mechanical interface 726 is attached to the bushing 605.

When the mechanical interface 726 is attached to the bushing 605, the mechanical interface 726 extends from the wall 681 in the +Z direction and into the cabinet interior 682. The vacuum interrupter 120 extends along the Y axis and is oriented vertically (substantially parallel to the local gravity vector). The portion 717 is oriented toward the wall 681 such that the power apparatus 755 extends toward the wall 681 and in the same direction as the mechanical interface 726. This configuration helps to improve the mechanical stability of the mounting between the electrical connector 710 and the bushing 605. The load-side conductor 111 is electrically connected to the current port 751, which extends in the +Y direction.

Figure 13:
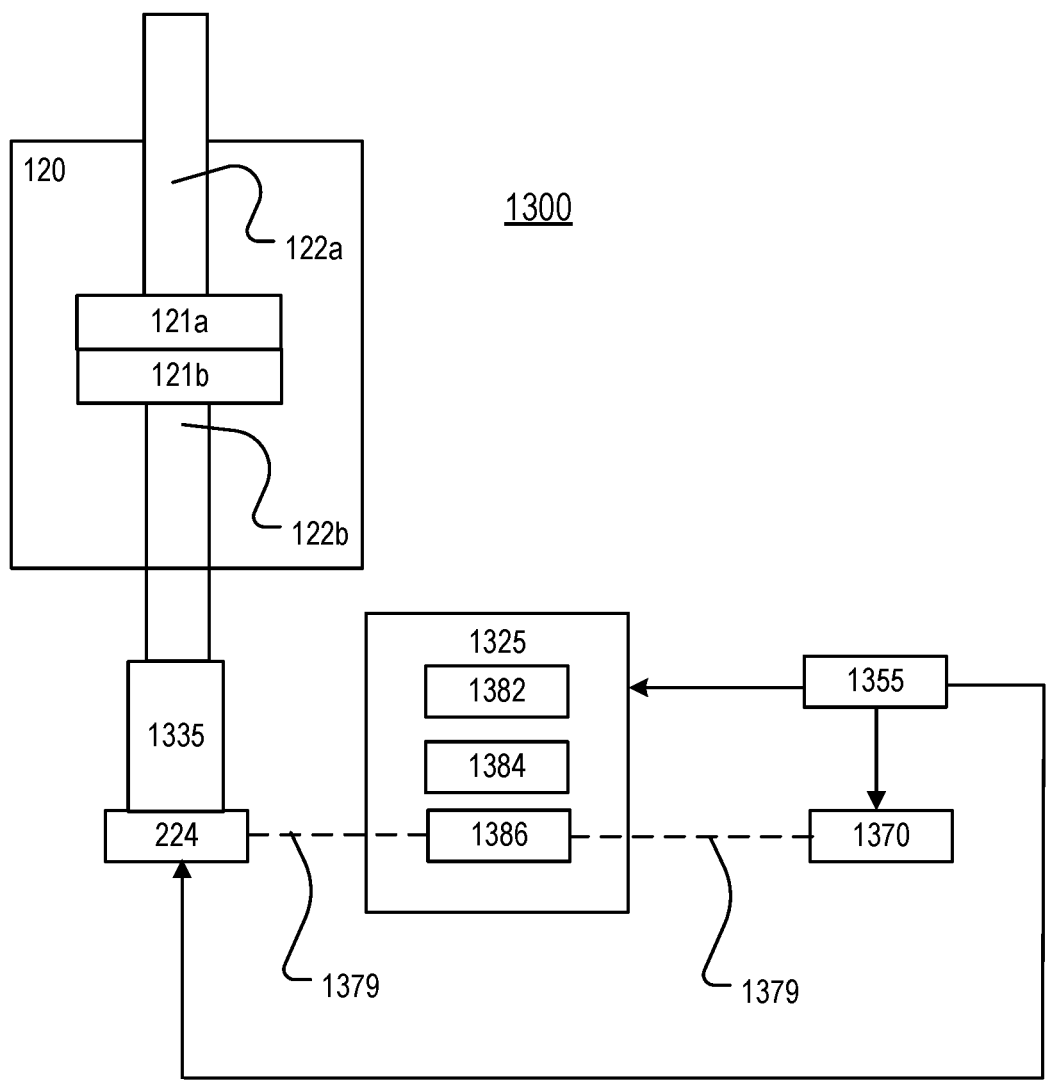
FIG. 13 is a block diagram of an example of a system.

FIG. 13 is a block diagram of a system 1300. The system 1300 includes a control system 1325, which may be used as the control system 125 or 225. The control system 1325 controls the state of the vacuum interrupter 120. The system 1300 also includes a power apparatus 1355, a sensor system 1370, and a push rod 1335. The power apparatus 1355 may be any of the power apparatuses discussed above, the sensor system 1370 may be any of the sensor systems discussed above, and the push rod 1335 may be any of the push rods discussed above. The control system 1325 may be used with electrical connectors that have a parallel arrangement and with electrical connectors that have a non-parallel arrangement.

In FIG. 13, the solid lines between the power apparatus 1355 and the actuator 224, the sensor system 1370, and the control system 1325 indicate that the power apparatus 1355 may provide electrical power to these components. The control system 1325 communicates with the actuator 224 and the sensor system 1370 via data paths 1379 that are shown in dashed lines. The data paths 1379 are any type of device capable of carrying signals that include information. For example, the data paths 1379 may be electrical wires that carry electrical signals, and/or a transceiver that sends and receives optical or electrical signals.

The control system 1325 includes an electronic processing module 1382, an electronic storage 1384, and an input/output (I/O) interface 1386. The electronic processing module 1382 includes one or more electronic processors. The electronic processors of the module 1382 may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC).

The electronic storage 1384 may be any type of electronic memory that is capable of storing data, and the electronic storage 1384 may include volatile and/or non-volatile components. The electronic storage 1384 and the processing module 1382 are coupled such that the processing module 1382 may access or read data from the electronic storage 1384 and may write data to the electronic storage 1384. The electronic storage 1384 also may store data received from the actuator 224, the sensor system 1370, the power apparatus 1355, and/or the vacuum interrupter 120. For example, the electronic storage 1384 may store data collected by the sensor system 1370 over time. The electronic storage 1384 also may store information and data related to the operation of the vacuum interrupter 120. For example, the electronic storage 1384 may store a current threshold associated with a fault condition. The electronic storage 1384 also may store instructions as, for example, a computer program or function, that when executed by the electronic processing module 1382 analyzes data from the sensor system 1370 to determine whether or not a fault condition is present. If the data from the sensor system 1370 indicates that a current flowing in the load-side conductor 131 exceeds the current threshold, the control system 1325 declares that a fault condition is present. The electronic storage 1384 also stores instructions that, when executed by the electronic processing module 1382, controls a current source to control current flow in the coil 241 of actuator 224 such that the moveable contact 121*b* separates from the stationary contact 121*a* when a fault condition is declared or detected. The electronic storage 1384 also may store instructions that cause the vacuum interrupter 120 to change state in response to other inputs and/or other information, such as an input from an end-user or a command from a remote station or from a manual operating handle (such as the manually operating device 238 shown in FIGS. 2A and 2B).

The I/O interface 1386 is any interface that allows a human operator and/or an autonomous process to interact with the control system 1325. The I/O interface 1386 may include, for example, a display, audio input and/or output (such as speakers and/or a microphone), a serial or parallel port, a Universal Serial Bus (USB) connection, and/or any type of network interface, such as, for example, Ethernet. The I/O interface 1386 also may allow communication without physical contact through, for example, an IEEE 802.11, Bluetooth, or a near-field communication (NFC) connection. The control system 1325 may be, for example, operated, configured, modified, or updated through the I/O interface 1386.

The I/O interface 1386 is also connected to the data paths 1379 and allows the control system 1325 to communicate with the actuator 224. For example, the control system 1325 sends the actuator 224 commands through the I/O interface 1386 that cause the actuator 224 to move the push rod 1335 and moveable rod 122b to thereby open or close the vacuum interrupter 120. The control system 1325 also may receive data and information about the vacuum interrupter 120 from the actuator 224 via the I/O interface 1386. For example, the control system 1325 may receive status messages from the actuator 224 indicating whether or not the moveable rod 122b moved in response to a command signal via the I/O interface 1386.

The I/O interface 1386 also may allow the control system 1325 to communicate with systems external to and remote from an electrical connector that includes the vacuum interrupter 120. For example, the I/O interface 1386 may include a communications interface that allows communication between the control system 1325 and a remote station using, for example, the Supervisory Control and Data Acquisition (SCADA) protocol or another services protocol. The remote station may be any type of station through which an operator is able to communicate with the control system 1325 without making physical contact with the control system 1325. For example, the remote station may be a computer-based work station, a smart phone, remote control, tablet, or a laptop computer that connects to the control system 1325 via a services protocol, or a remote control that connects to the control system 1325 via a radio-frequency signal.

The above implementations are within the scope of the claims. Other implementations are also within the scope of the claims. For example, the above examples show a single phase. However, any of the electrical connectors 110, 210, 510, 710, 810, 910, 1010, and 1110 may be used in a multi-phase system. For example, in a three-phase system, the cabinet 680 may contain three electrical connectors, each of which is connected to one phase of the distribution path 104.

Although the electrical connectors 210 and 510 include the removable cover 215 and the cap 515, respectively, the electrical connectors 210 and 510 may be implemented without the cover 215 and the cap 515, respectively. In implementations of the electrical connector 210 that do not include the cover 215, the main body 216 extends in the areas that are shown with the cover 215. In these implementations, the interior space 213 of the electrical connector 210 is not accessible and the internal components of the electrical connector 210 remain enclosed after initial assembly. Moreover, the indicator window 254 is formed in the body 216. In implementations of the electrical connector 510 that do not include the cap 515, the housing 512 extends in the areas that are shown with the cap 515. In these implementations, the interior components of the electrical connector 510 remain enclosed after initial assembly.

Similarly, the electrical connector 710 may be implemented as a single-piece device that does not include the removable cover 715.

Any of the electrical connectors 110, 510, 810, 910, 1010, and 1110 may be installed in the cabinet 680.

What is claimed is:

1. An electrical connector comprising:
    a housing comprising a mechanical interface, the mechanical interface configured to mechanically connect the electrical connector to a bushing;
    a current path in the housing, the current path comprising:
        an electrical conductor; and
        a switching apparatus electrically connected to the electrical conductor, the switching apparatus associated with operating states, the operating states comprising at least a first state that closes the current path and a second state that opens the current path;
    a switch control apparatus in the housing, the switch control apparatus configured to control the operating state of the switching apparatus; and
    a power apparatus in the housing, the power apparatus comprising an energy storage device electrically connected to the switch control apparatus, wherein the power apparatus is configured to obtain electrical energy from the current path and store obtained electrical energy in the energy storage device.

2. The electrical connector of claim 1, wherein the switching apparatus comprises a vacuum interrupter, and the switch control apparatus comprises an actuator that is configured to control a position of a moveable contact of the vacuum interrupter relative to a stationary contact of the vacuum interrupter; and wherein
    the operating states of the vacuum interrupter comprise an open state and a closed state, the stationary contact and the moveable contact are not connected to each other in the open state, and the stationary contact and the moveable contact are connected to each other in the closed state.

3. The electrical connector of claim 2, wherein the power apparatus comprises a current transformer, the current transformer comprising:
    an input coil that is configured to magnetically couple to the current path, and
    an output that is electrically connected to the energy storage device.

4. The electrical connector of claim 1, wherein
    the housing comprises a first portion that extends in a first direction, and a second portion that extends in a second direction;
    the mechanical interface extends in the first direction from an end of the first portion; and
    the switching apparatus is in the second portion.

5. The electrical connector of claim 4, wherein the switching apparatus comprises an actuator, and the actuator is in the second portion.

6. The electrical connector of claim 5, wherein the housing further comprises a compartment that extends from the second portion, and the power apparatus is in the compartment.

7. The electrical conductor of claim 6, wherein the first direction and the second direction are orthogonal directions, and, when the mechanical interface is attached to the bushing: the first portion extends horizontally, the second portion and the switching apparatus extend vertically, and the power apparatus is under the first portion.

8. The electrical connector of claim 1, wherein
    the housing comprises a first portion that extends in a first direction;
    the mechanical interface extends in the first direction from a first end of the first portion; and
    the electrical conductor, the switching apparatus, and the switch control apparatus are in the first portion.

9. The electrical connector of claim 8, wherein
    the housing further comprises a compartment that extends from the first portion in a second direction; and
    the power apparatus is in the compartment.

10. The electrical connector of claim 9, wherein when the mechanical interface is attached to the bushing, the switching apparatus extends horizontally.

11. The electrical connector of claim 1, further comprising an electronic controller configured to control the switch control apparatus.

12. The electrical connector of claim 11, wherein at least part of the electronic controller is in the housing.

13. The electrical connector of claim 11, wherein the electronic controller is configured to communicate with a separate electronic device that is outside of the housing.

14. The electrical connector of claim 1, wherein the housing comprises at least a first piece and a second piece, the first piece is configured to be connected to and disconnected from the first piece to allow access to an interior of the housing, and, when the first piece is connected to the second piece, the switch control apparatus, the switching apparatus, and the power apparatus are enclosed in the housing.

15. The electrical connector of claim 14, wherein the first piece covers a first side of the switching apparatus, and the second piece covers a second side of the switching apparatus.

16. The electrical connector of claim 14, wherein the first piece comprises an electrically insulating and moldable rubber material, and the second piece comprises a rigid polymer material.

17. The electrical connector of claim 1, further comprising an internal structure that holds the switching apparatus, the switch control apparatus, and the power apparatus in a fixed spatial relationship with each other.

18. The electrical connector of claim 17, wherein the internal structure is a rigid structure that is in the housing.

19. The electrical connector of claim 1, wherein the electrical conductor comprises a spring-loaded tulip.

20. The electrical connector of claim 1, further comprising an opening that passes through the housing, the opening configured to allow air to flow into and out of an interior of the housing.

21. A system comprising:
a utility cabinet comprising: a wall, and a bushing that extends from the wall; and
an electrical connector comprising:
a housing comprising a connection interface configured to connect the electrical connector to the bushing;
a current path in the housing, the current path comprising:
an electrical conductor, and
a switching apparatus electrically connected to the electrical conductor, the switching apparatus associated with operating states, the operating states comprising at least a first state that closes the current path and a second state that opens the current path;
a switch control apparatus in the housing, the switch control apparatus configured to control the operating state of the switching apparatus; and
a power apparatus in the housing, the power apparatus comprising an energy storage device electrically connected to the switch control apparatus, wherein the power apparatus is configured to obtain electrical energy from the current path and store obtained electrical energy in the energy storage device.

22. The system of claim 21, wherein the wall extends in a plane, and, when the connection interface is connected to the bushing, the switching apparatus is substantially parallel to the plane.

23. The system of claim 21, wherein the wall extends in a plane, and, when the connection interface is connected to the bushing, the switching apparatus is substantially perpendicular to the plane.

24. An electrical connector comprising:
a housing comprising:
a first portion;
a second portion that is configured to be repeatedly attached and removed from the first portion; and
a mechanical interface, the mechanical interface configured to mechanically connect the electrical connector to a bushing, and wherein the electrical connector further comprises:
a current path in the housing, the current path comprising:
an electrical conductor, and
a switching apparatus electrically connected to the electrical conductor, the switching apparatus associated with operating states, the operating states comprising at least a first state that closes the current path and a second state that opens the current path, and wherein,
when the first portion and the second portion are attached, the housing surrounds the switching apparatus, and, when the second portion is removed from the first portion, the switching apparatus and an interior of the housing are accessible.

25. The electrical connector of claim 24, wherein, when the first portion and the second portion are attached, the housing defines an interior space; and the switching apparatus and the electrical conductor are in the interior space.

26. The electrical connector of claim 25, further comprising an indicator window in one of the first portion and the second portion, the indicator window configured to allow observation of the interior space when the first portion and the second portion are attached.

27. An electrical connector comprising:
a housing comprising a mechanical interface, the mechanical interface configured to mechanically connect the electrical connector to a bushing;
a current path in the housing, the current path comprising:
an electrical conductor; and
a switching apparatus electrically connected to the electrical conductor, the switching apparatus associated with operating states, the operating states comprising at least a first state that closes the current path and a second state that opens the current path;
a switch control apparatus in the housing, the switch control apparatus configured to control the operating state of the switching apparatus; and
a power apparatus in the housing, the power apparatus configured to obtain electrical energy from the current path and provide electrical energy to the switch control apparatus, wherein an opening passes through the housing, the opening configured to allow air to flow into and out of an interior of the housing.

* * * * *